United States Patent
Snijders et al.

(10) Patent No.: US 7,099,844 B1
(45) Date of Patent: Aug. 29, 2006

(54) INSTALLATION AND METHOD FOR TRADING IN INFLATION

(76) Inventors: Ronald Edward Snijders, Gerrit van de Veenstraat 19, NL-1077 DM Amsterdam (NL); John Robert Fiszbajn, Van Lennepweg 40, NL-2597 LK Den Haag (NL)

( * ) Notice: Subject to any disclaimer, the term of this patent is extended or adjusted under 35 U.S.C. 154(b) by 374 days.

(21) Appl. No.: 09/890,987

(22) PCT Filed: Jul. 17, 2000

(86) PCT No.: PCT/NL00/00499

§ 371 (c)(1),
(2), (4) Date: Aug. 27, 2001

(87) PCT Pub. No.: WO02/07033

PCT Pub. Date: Jan. 24, 2002

(51) Int. Cl.
*G06Q 40/00* (2006.01)

(52) U.S. Cl. .......................... 705/39; 705/40

(58) Field of Classification Search ................ 705/35, 705/36, 39, 38, 40

See application file for complete search history.

(56) References Cited

U.S. PATENT DOCUMENTS

| | | | | |
|---|---|---|---|---|
| 4,752,877 A * | 6/1988 | Roberts et al. | ........... | 705/36 R |
| 5,970,479 A * | 10/1999 | Shepherd | ..................... | 705/37 |
| 6,029,146 A * | 2/2000 | Hawkins et al. | ............... | 705/35 |
| 6,052,673 A * | 4/2000 | Leon et al. | ..................... | 705/38 |
| 6,134,536 A * | 10/2000 | Shepherd | ..................... | 705/37 |
| 6,188,992 B1 * | 2/2001 | French | ......................... | 705/35 |
| 6,304,858 B1 * | 10/2001 | Mosler et al. | ................ | 705/37 |
| 6,360,210 B1 * | 3/2002 | Wallman | .................. | 705/36 R |
| 6,684,190 B1 * | 1/2004 | Powers et al. | ............ | 705/36 R |
| 2004/0019558 A1 * | 1/2004 | McDonald et al. | ............ | 705/38 |

* cited by examiner

*Primary Examiner*—Vincent Millin
*Assistant Examiner*—Thu Thao Havan
(74) *Attorney, Agent, or Firm*—Kirkpatrick & Lockhart Nicholson Graham LLP

(57) ABSTRACT

Installation and method for performing a financial service comprising the following steps:
(a) calculation of at least one inflation correction value for a desired coupon value CV in a year i making use of the coupon value CV and of future index data $I_i$;
(b) calculation of a cash value of the at least one inflation correction value for the coupon value CV in year i making use of the coupon value CV, the future index data $I_i$ and the interest rates $int_i$;
(c) presentation of a purchase price to a purchaser at which the at least one inflation correction value for the coupon value CV, or a portion thereof, can be purchased.

29 Claims, 10 Drawing Sheets

INSTALLATION AND METHOD FOR TRADING IN INFLATION

BACKGROUND TO THE INVENTION

As a consequence of frequent contacts with the boards of directors—and departments which are responsible for investments—of pension funds and other institutional investors the inventors of the invention have made an in-depth study of the current investment problems for institutional investors in The Netherlands.

It can be concluded that all subscribe to the following statement of the problem: "How can I, apart from the existing investment alternatives, invest my capital such that it holds its value (is inflation-proof) and at the same time increase my yield and reduce the costs, time and attention to be expended on overall management of the capital".

A description of the current state of affairs, the investment products, the results, the trend and the problems is given in broad outline below.

Current Situation

Pension holdings in The Netherlands amount to more than one thousand billion guilders (where 'billion' is interpreted here and below as 'one thousand million'). These holdings are managed by pension funds with the aim of investing the pension holdings such that they hold their value (are index-linked) (inflation-proof) so that those entitled to a pension ultimately receive an (index-linked) pension at any point in time in the future.

It has been calculated that if the pension funds achieve a yield of 4% plus the rise due to inflation they are able to meet this aim and also to cover the costs of their organisation.

In order to achieve this "4%+inflation cover" the funds to be invested are roughly invested in three ways:

in bonds (government loans)—in general a somewhat lower but certain yield in shares—in general a higher yield, but with higher risk in property—in general a yield between that from bonds and shares, but with inflation cover.

Detailed study of these three different investment products has taught us that the major difference between government loans and shares, on the one hand, and property, on the other hand, is the inflation component. After all, since in The Netherlands the rents for offices, shops and other commercial property increase annually by the percentage inflation, by means of an "index clause" included as standard in the lease, and this is by and large also the case for residential lettings, this means that the investment in property offers a yield that gives inflation cover. An additional factor here is that the higher the inflation the higher are the rents and the greater is the increase in value of property. In short, investments in property in general react positively to inflation.

The pre-set yield on government loans suffers under inflation and investment in government loans therefore implies an inflation risk.

This also applies in the case of investment in shares. Higher inflation fuels rises in wages and salaries, which can have an adverse consequence on profits, with a fall in the share value as a result.

In short, investments in government loans and shares in general react negatively to inflation.

So why do pension funds—which in particular fear (high) inflation—not invest in property? The reasons for this are as follows:

Good property—correct price/yield ratio—is scarce and therefore, in contrast to shares, for example, is not available for the investment of billions at any point in time.

Property is also not as liquid as, for example, government loans or shares.

Investments in property react well to inflation only if there is (virtually) full occupancy. Good management is required to avoid premises standing empty. Good management is scarce and expensive.

The costs of managing property are many times higher than those for government loans and/or shares. Owning property costs a great deal more time and attention (changing tax legislation, maintenance, collection charges, rent review procedures, property standing empty, etc.) than does the possession of, for example, a share portfolio. In this context, both those who own property and those who own shares must continue accurately to monitor market trends in relation to their investment.

An Overview

Currently in excess of one thousand billion guilders are invested in The Netherlands, as is shown diagrammatically in FIG. 1. The average yield over a period of 30 years is approximately 5% per year for government loans, approximately 12% per year for shares and approximately 6%+inflation cover per year for property. FIG. 1 also indicates where pension funds expend most costs, time and attention.

Pension Funds, Investment Results: an Area of Tension

Developments over (just) the last 5 years have led to the investment results achieved by the pension funds being compared with one another and to the introduction of so-called "benchmarking". The investment results are looked at to determine which pension funds have a better or poorer performance than the average investment results achieved by the funds. If a better than average investment result is achieved, this is frequently dismissed as "luck", but if a poorer than average investment result is achieved this is penalised, certainly if this is the case 3 years in succession. Those entitled to a pension may then (collectively) decide to switch to a different fund which has better investment results.

The above encourages all funds to invest in virtually the same way. After all, if they all do the same no one is doing any worse than another. In the case of investments in government loans and shares this is relatively easy to do, via, for example, the funds quoted on the Amsterdam stock exchanges. Investment in property precludes this since, by definition, the ownership of each property is different.

A gap, or area of tension, is therefore opening up between the boards of trustees of pension funds and the management (executive board) of those funds, a management that has under-performed (i.e. has achieved investment results below the benchmark) for one or two years, for whatever reason, being under, or being placed under, great pressure.

Having due regard for all the above, it is virtually impossible for management to catch up lost ground compared with the results achieved by other funds, unless better results can be achieved by means of large property transactions, but this is not very probable.

SUMMARY OF THE INVENTION

In short, the management of pension funds, (in particular those funds which have under-performed) is looking for alternative investments which, on the one hand, cover inflation, cost appreciably less time, demand less attention and have a lower risk than the existing property investments and, on the other hand, also have the inherent possibility of recording much higher yields (investment results) than other funds and/or existing investment products.

The solution proposed here is based on the legal option open to the owner of property to sell and to assign the right to the annual increase in the rent, which is related to the price index (inflation index)—and which right is frequently laid down in one article of the lease—for a certain period. Or, to put it in more general terms, the solution lies in trading in inflation.

To this end the invention provides an installation for supporting a financial transaction, comprising at least a memory and a processor, which is connected to the memory and is equipped to perform the following steps under the control of a program stored in the at least one memory:

(a) storage of future index data $I_i$, where i=1, 2, ... x, in the at least one memory, each future index $I_i$ being defined as the anticipated factor by which in a year i goods will have become more expensive as a consequence of inflation, compared with a predetermined start year;

(b) storage of future interest rates $int_i$, where i=1, 2, ... x, in the at least one memory, each interest rate $int_i$ being defined as the interest rate to be anticipated in year i;

(c) receipt of a desired coupon value CV from a user;

(d) calculation of at least one inflation correction value for the coupon value CV in year i making use of the coupon value CV and of the future index data $I_i$, (e) calculation of a cash value of the at least one inflation correction value for the coupon value CV in year i making use of the coupon value CV, the future index data $I_i$ and the interest rates $int_i$;

(f) presentation of a purchase price to the user at which the at least one inflation correction value for the coupon value CV, or a portion thereof, can be purchased.

The invention also provides a method for supporting a financial transaction with the aid of an installation comprising at least one memory and a processor connected thereto, the method comprising the following steps on the installation:

(a) storage of future index data $I_i$, where i=1, 2, ... x, in the at least one memory, each future index $I_i$ being defined as the anticipated factor by which in a year i goods will have become more expensive as a consequence of inflation, compared with a predetermined start year;

(b) storage of future interest rates $int_i$, where i=1, 2, ... x, in the at least one memory, each interest rate $int_i$ being defined as the interest rate to be anticipated in year i;

(c) receipt of a desired coupon value CV from a user;

(d) calculation of at least one inflation correction value for the coupon value CV in year i making use of the coupon value CV and of the future index data $I_i$, (e) calculation of a cash value of the at least one inflation correction value for the coupon value CV in year i making use of the coupon value CV, the future index data $I_i$ and the interest rates $int_i$;

(f) presentation of a purchase price to the user at which the at least one inflation correction value for the coupon value CV, or a portion thereof, can be purchased.

The invention also provides a computer program product that can be loaded on a computer installation for supporting a financial transaction, which computer installation comprises at least one memory (5, 7, 9, 11) and a processor (1) connected thereto, which processor can perform the following steps after the computer program product has been loaded:

(a) storage of future index data $I_i$, where i=1, 2, ... x, in the at least one memory, each future index $I_i$ being defined as the anticipated factor by which in a year i goods will have become more expensive as a consequence of inflation, compared with a predetermined start year;

(b) storage of future interest rates $int_i$, where i=1, 2, ... x, in the at least one memory, each interest rate $int_i$ being defined as the interest to be anticipated in year i;

(c) receipt of a desired coupon value CV from a user;

(d) calculation of at least one inflation correction value for the coupon value CV in year i making use of the coupon value CV and of the future index data $I_i$, (e) calculation of a cash value of the at least one inflation correction value for the coupon value CV in year i making use of the coupon value CV, the future index data $I_i$ and the interest rates $int_i$;

(f) presentation of a purchase price to the user at which the at least one inflation correction value for the coupon value CV, or a portion thereof, can be purchased.

In a more general sense the invention relates to a way of doing business, defined as a method for performing a financial service comprising the following steps:

(a) calculation of at least one inflation correction value for a desired coupon value CV in a year i making use of the coupon value CV and of future index data $I_i$, each future index $I_i$ being defined as the anticipated factor by which in a year i goods will have become more expensive as a consequence of inflation, compared with a predetermined start year;

(b) calculation of a cash value of the at least one inflation correction value for the coupon value CV in year i making use of the coupon value CV, the future index data $I_i$ and interest rates $int_i$, each interest rate $int_i$ being defined as the interest to be anticipated in year i;

(c) presentation of a purchase price to a purchaser at which the at least one inflation correction value for the coupon value CV, or a portion thereof, can be purchased.

BRIEF DESCRIPTION OF THE DRAWINGS

The invention will be explained in more detail below with reference to a few figures which are intended solely by way of illustration of the invention and not as a restriction of the scope thereof.

DESCRIPTION OF A FEW EMBODIMENTS

A Small-Scale Example

Figure 1:
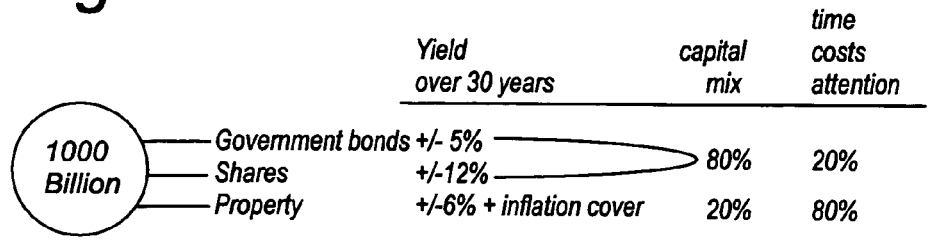
FIG. 1 shows a few important parameters with regard to pension portfolios.

If a supermarket has a lease with the owner of a property for a period of 10 years and the starting rent in the first year is one hundred thousand guilders per year, the owner would then be able to sell the right to the receipt of the annual increase in rent for a period of 10 years to a party who wishes to pay a one-off sum for this in advance. The inflation to be expected over 10 years is then converted to cash at a fixed percentage and paid for.

The party who pays this sum—the purchaser of the inflation cover—then receives the actual inflation on the (in this example) one hundred thousand annually for 10 years.

The person who receives the cash sum—the inflation seller—actually pays the actual inflation each year on the sum covered and for security can, for example, proceed to assign his/her right to the annual inflation-related increase in rent for a period of 10 years.

Entering into such an agreement can have many advantages for the owner, in which context consideration must be given in particular to the lower amount of own funds that as a rule is required in order, for example, to purchase property.

A Large-Scale Example

A pension fund has a property portfolio with rental revenue of 200 million guilders per year. The value of this whole portfolio is approximately 2.5 billion guilders and the book value is significantly lower. The pension fund—or at least the management—is under pressure. The fund, that has under-performed for two years, must perform better in the years to come. The management therefore wants to restrict costs as far as possible and is considering selling the property held directly and investing indirectly by means of property funds. However, both sale and indirect investment have many disadvantages.

These problems can be solved for the fund by means of the two transactions described below. The transactions described below lead to retention of the advantage of the ownership of a property portfolio, that is to say the cover against inflation, but also to a saving of about 80% of the costs, time and attention and a possible increase in yield of 100% over the yield achieved to date on the property portfolio.

The Two Transactions

On day 1 the pension fund sells its entire property portfolio to a fund to be specially set up, the "Inflation Exchange Fund", which hereinafter will be designated IEF, for 2.6 billion guilders. However, it immediately buys back the entire portfolio, but the transfer date is 30 years ahead. The buy-back sum is then also 2.6 billion guilders, but increased by a percentage of the rise in value. In addition to this sale and buy back, the pension fund also enters into yet a further transaction with the IEF and specifically the following. The IEF sells and assigns the annual inflation-related increase in rent to the pension fund, likewise from day 1 for a period of 30 years, and does so for an amount to be paid by the pension fund as a lump sum to the IEF.

In other words the IEF starts with a portfolio which has a starting rent of 200 million per year, which rent, assuming, for example, annual inflation at 2%, is 204 million in year 2, 208.08 million in year 3, 212.24 million in year 4, 216.49 million in year 5, etc.

This calculation, assuming, for example, 2% per year, will give the following results for an initial rent of 200 million:

| | | |
|---|---|---|
| Year 1: | 2% × 200 million = 4 million | new rent 204 million, |
| Year 2: | 2% × 204 million = 4.08 million | new rent 208.08 million, |
| Year 3: | 2% × 208.8 million = 4.16 million | new rent 212.24 million, |
| Year 4: | 2% × 212.976 million = 4.24 million | new rent 216.49 million, |
| etc. | | |

Figure 2:
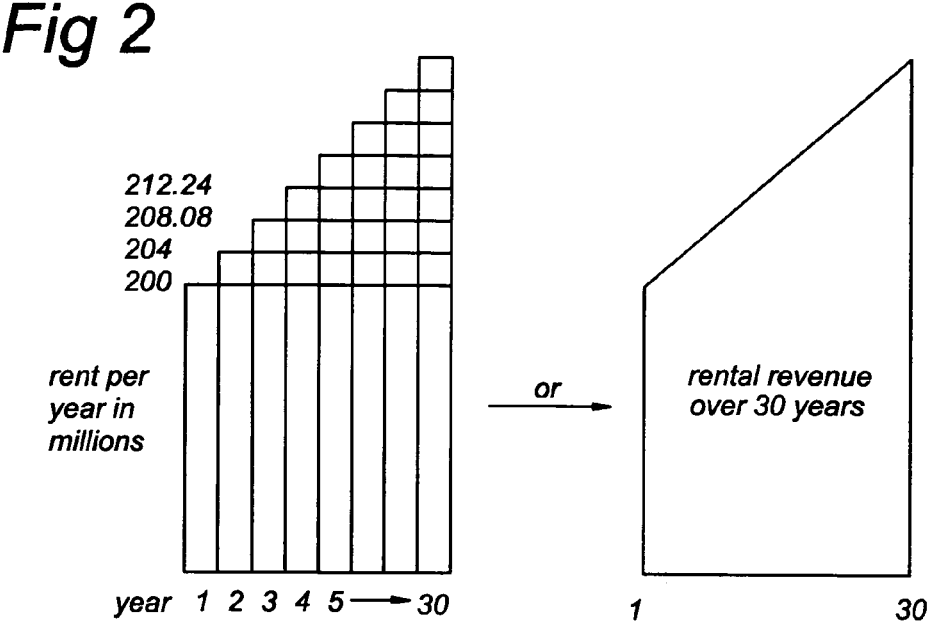
FIG. 2 shows the principle of trading in inflation with rental revenue as the basis for inflation revenue.

The results of the various calculations are shown in FIG. 2.

Figure 3:
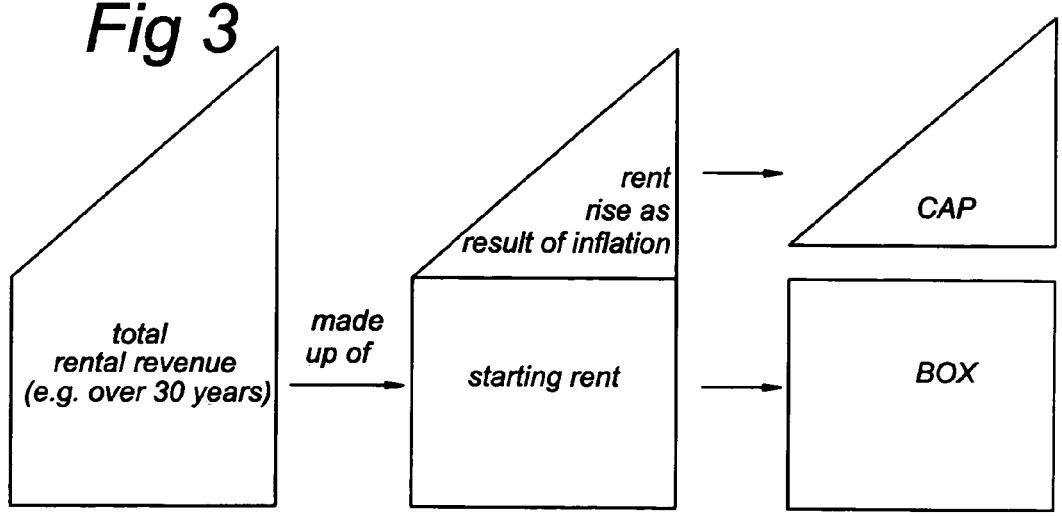
FIG. 3 shows the difference between rental revenue and additional rental revenue as a consequence of inflation.

The rent over 30 years, increasing with an annual inflation of, for example, 2%, can be represented as shown in FIG. 3, where all annual increases in rent due to inflation added together represent a value which will be paid out to the pension fund via the IEF in the course of 30 years, if the inflation actually turns out to be 2% each year.

The triangle shown in FIG. 3 is termed the CAP. The square (the initial rent, which over 30 years rises by the CAP) is termed the BOX.

(On the basis of the above example) the IEF pays the following to the pension fund:

| | | |
|---|---|---|
| (d) | in year 1: | 0 guilders |
| (e) | in year 2: | 4 million, |
| (f) | in year 3: | 8.08 million, |
| (g) | in year 4: | 12.24 million, |
| (h) | in year 5: | 16.49 million, |
| (i) | etc. | |

The IEF will continue to make payments in this way for the agreed term (i.e. 30 years) and thus over a period of 30 years pays the annual inflation-related increase on a sum of 200 million guilders to the pension fund. The IEF consequently covers 200 million for a period of 30 years against inflation for the pension fund. In return for this, the pension fund pays the IEF a lump sum, which is the purchase price for the inflation cover. In order to arrive at a price, the IEF and the pension fund will calculate the cash value of the inflation to be expected in 30 years. (See below: the purchase price).

In addition to this calculation, the IEF's estimate of the ability to achieve full occupancy for a period of 30 years and the fear of "the spectre of inflation" on the part of the pension fund and the possibility for other investment variants will have an influence on the price, purchase price, finally to be agreed for the inflation cover.

For example, a purchase price of 600 million is agreed, which purchase price is paid to the IEF by the pension fund on day 1. By payment of this sum the pension fund covers a sum of 200 million guilders against inflation for a period of 30 years from day 1. The contract concluded in this matter is termed an Inflation Exchange Contract or IEC.

Figure 4:
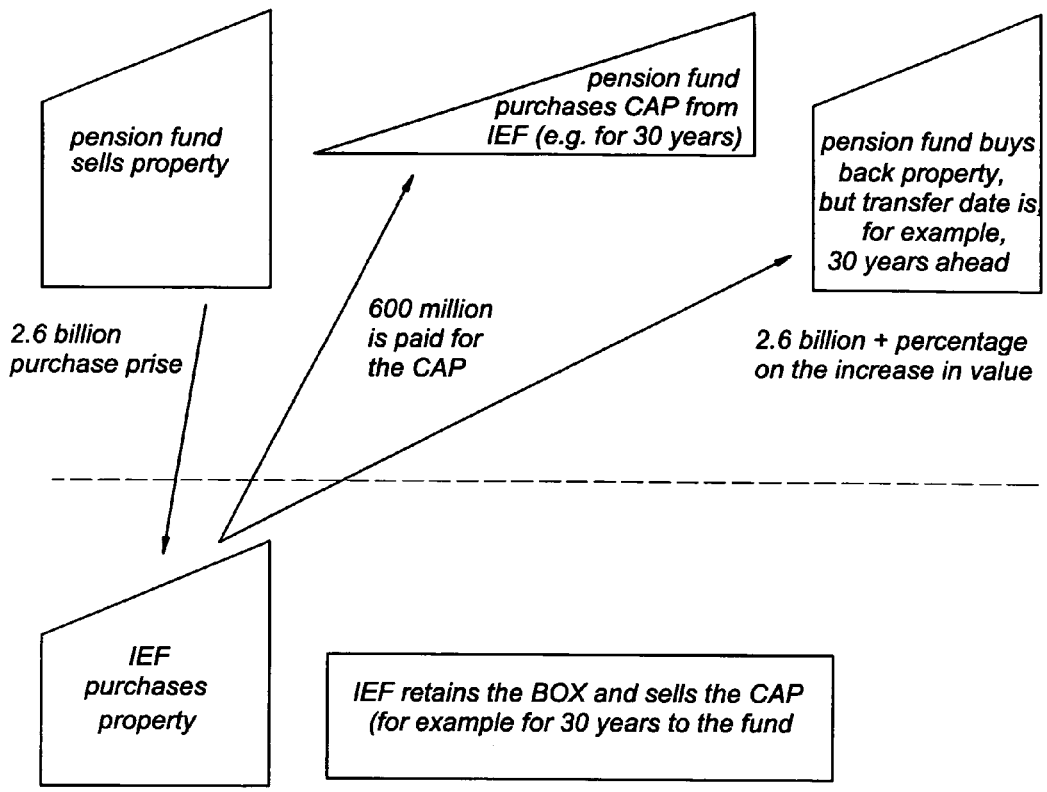
FIG. 4 shows basic transactions during trading in inflation.

The above two transactions, that is to say the sale and buy back of the property, on the one hand, and the purchase of the IEC (the CAP for the property portfolio), on the other hand, can be shown easily in a drawing: see FIG. 4.

The advantages for the pension fund are first discussed below and the advantages for the IEF are then discussed.

The Advantages for the Pension Fund

1. The pension fund makes a book profit of 2.6 billion guilders on day 1 from the sale of its property portfolio, as a result of which its results for that year improve.
2. By purchasing inflation cover on a sum of 200 million for a period of 30 years for a one-off payment of 600 million on day 1, the pension fund retains the advantages associated with the possession of its portfolio, that is to say the inflation cover, but in addition to this inflation cover it has liquid funds of 2 billion guilders. It invests these 2 billion guilders in shares for a period of 30 years. By this means it receives a yield of 12%, as well as inflation cover on 200 million guilders. Thus, where it initially had a yield from its property portfolio of 6%+inflation cover it is now able to achieve a yield of 12%+inflation cover.
3. As a result of the sale of the entire property portfolio, the workload and the associated costs fall by 80%. All the care and attention relating to property management has been disposed of and is now the responsibility of the IEF.
4. The decision on the part of the pension fund to conclude the transactions described with the IEF is a relatively simple decision. After all, the risks do not increase, but even decrease appreciably (see 6 below). The decision is also politically advantageous; after all the property portfolio built up with care over the years is not truly disposed of (as in the case of an indirect property portfolio)—it is retained for the fund—but on the other hand the care and attention required for day-to-day running has been disposed of for a long period. Thus, the portfolio has been sold but the property returns to pension fund ownership at the end of the set term. The fundamental decision on whether or not to maintain a direct or indirect property portfolio is thus postponed for an entire generation of administrators, with all the associated advantages. All options are held open.
5. Compared with retaining ownership of the property portfolio, the flexibility and liquidity increases appreciably for the funds and specifically does so in respect of the following 3 aspects:
   (a) conversion of the property portfolio to liquid funds;
   (b) conversion of the right to deliver a property portfolio or a portion thereof to liquid funds;
   (c) conversion of the right to inflation cover to liquid funds.

Figure 5:
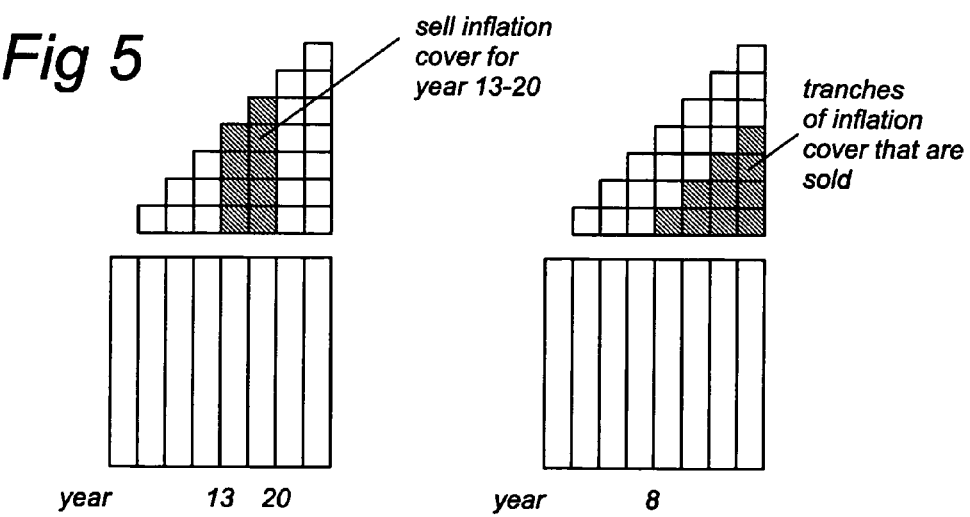
FIG. 5 shows how it is possible to trade in portions of inflation.

Re a.
      The flexibility for the fund increases as far as the conversion of the property portfolio to liquid funds is concerned. After all, the property portfolio has been converted to liquid funds as a result of the sale.
   Re b.
      Converting the right to deliver a property portfolio or part thereof to liquid funds. In addition to the purchase price achieved, the pension fund has also acquired another asset, specifically the right to trade in return of the portfolio after, for example, 30 years. If the value of the property portfolio increases to above the agreed purchase sum, and this will virtually certainly take place in 30 years, the value of the right to deliver then becomes greater and can be sold.
      After all, it is improbable that the value of the property portfolio (2.6 billion) will not have at least doubled after 30 years. As the years go by more clarity will be obtained with regard to the trend in the value and the price for the right to deliver will increase. There is no need to say that the pension fund can also sell a right to deliver for part of the portfolio, for example only the right to offices or to, for example, a percentage of the portfolio.
   Re c.
      Converting the right to inflation cover to liquid funds. Moreover, the pension fund is able to sell the right to the annual inflation on 200 million at any point in time and can do so in various ways.
      Firstly, the period can differ. After all, the fund does not have to sell its right to inflation cover for 0 to 30 years. If, for example, few people entitled to a pension in a period of between 13 and 20 years make up part of its funds, it can sell the inflation cover for that period (year 13 to year 20).
      If at the time the inflation cover was purchased the expectation was, for example, that inflation would be approximately 2% per annum, the expectation can then have been adjusted to, for example, 4% inflation per annum after, for example, 5 years. There will then be purchasers who, for example, may be prepared to pay the fund just as much for cover from year 13 to year 20 as the find has paid for the period of 1–30 years with a lower inflation expectation.
      Apart from the term which can differ, the fund can also decide to allow the sum that is covered against inflation to differ. For instance, it can decide to sell on inflation cover for a specific period at a given point in time, not on the sum of 200 million per year but, for example, on 100 million. Finally, it can also decide to sell tranches of inflation cover; see FIG. 5. In this case assumptions must then be made with regard to the interest and inflation which are anticipated in the years concerned.
      By, for example, covering a sum of 200 million annually against inflation in year 8, the fund retains the upper tranches for itself. After all, in year 8 the fund receives annual inflation cover paid out not on 200 million but on, for example, 228 million.
      The fund thus acquires the possibility for achieving precisely the cover against inflation which matches the number of index-linked benefit payments in a specific period.
      Trading in inflation has come into being in particular as a result of the possibility described here under c.
6. A further major advantage for a fund to conclude the transactions described is that the risk of its property portfolio standing empty can be limited. After all, if a pension fund does not sell its property it bears the full risk that some of its portfolio will stand empty as a result of changing market circumstances or as a result of poor management. This is a very substantial risk. After all, if a property is unoccupied the fund does not receive any index, any inflation cover, on the rent. Even worse, it also does not receive the rent!! Thus, non-occupancy can nullify the annual increase in rent as a consequence of inflation for the rented premises by acting as a negative lever. The basic rent is, after all, many times higher (frequently multiples of 10 higher) than the increase due to inflation. In other words, if a fund possesses a property portfolio for which the annual rent at a specific point in time is 200 million guilders, which rent is covered annually against inflation by the possibility of an annual increase in rent equal to inflation, there will not be anything or anybody to guarantee the fund, in the case of direct property ownership, that the rent will not have fallen to 190 million per year 3 years later as a result of poor management.

Well now, depending on the purchase sums to be paid to the IEF by the fund, it will be possible to agree with the IEF that the inflation will always be paid out on an initial sum of 200 million for a period of, for example, 30 years. This could be termed a derived product of the inflation: inflation insurance.

7. This possibility signifies a major, and therefore valuable, advantage for the fund.

8. Tying up of capital: The final significant advantage for the fund is that, apart from all the disadvantages attached to possessing property directly, the amount of capital tied up is also much more advantageous for the fund by means of the transaction described above.

After all, in order to cover, for example, 10 million against inflation it is necessary to purchase property with an initial rental income of 10 million per year. According to current standards, the price which has to be paid for this is approximately 135 million guilders. The price which—according to the current standards for inflation cover on 10 million per year for 30 years—has to be paid is approximately 35 million guilders. If available, it would thus be possible to purchase approximately 3 to 4 times as much inflation cover as is now covered for an identical payment by means of the purchase of property. In other words, the advantages for pension funds or other institutional parties to conclude the transactions described above are convincing.

Variants

It is, of course, not the aim that the advantages described above should provide a complete list. Many additional advantages are conceivable.

The pension fund can also continue to purchase property direct if opportunities arise. New property can optionally also be sold on again to the IEF, in addition to the transactions already concluded. This will possibly take place if share prices on the stock exchanges collapse within the 30 year period.

The pension fund can stipulate that it has the option of buying back property or parts thereof from the IEF at an earlier point in time, or pay for the buy back earlier than at the end of 30 years. This could take place if unexpected profits or tax advantages arise within 30 years.

The price—sale and purchase—of the property portfolio can vary.

The pension fund could also participate in the IEF, by which means greater involvement remains ensured, for example by means of nominating an official or taking over staff, etc.

In short, the problem mentioned in the introduction: "How can I cover my future financial obligations against inflation" and the answer to this: "In addition to the existing alternatives, one can cover one's future financial obligations against inflation by the purchase of inflation exchange contracts" is real and has been explained by the above.

The Problem in a Broader Context

It is not only pension funds but also (health)care insurers, governments, armies, employers and employees, multinationals, etc. which are faced with the problem described above, that is to say covering future financial obligations against inflation. This will also be considered further below.

For the time being it has been made clear:

that trading in inflation is trade worth billions;

that there is a demand (amounting to billions) for cover against inflation (apart from the speculative effect and arbitrage effect of the trade);

that by means of the product invented numerous practical advantages exist which are actually able to stimulate the trade, as a result of which implementation of the invention scores high on reality.

The Inflation Exchange Fund

The trade in inflation exchange contracts and the management of large property portfolios will have to be directly or indirectly initiated, supervised and handled by an organisation to be established for this purpose, which organisation we refer to as the "Inflation Exchange Fund" (IEF). Trade in inflation exchange contracts is not readily conceivable without such an organisation.

Therefore it is explained below that such an inflation exchange fund can operate highly profitably, as a result of which the reality score for actually setting up the inflation exchange fund and actual implementation of the invention, trade in inflation, is high.

The IEF is understood to be the organisation which purchases and sells back property, which manages the property and which sells and, where possible, purchases the IECs, as well as the organisation which sets up and organises the exchange (trade) in IECs and also the organisation which sets up and organises the trade as a bank. In practice, these organisations will probably be separate entities, such as IEF property, IEF bank, IEF insurance, IEF exchange.

Why the IEF has the Right to Exist

The Inflation Exchange Fund can and will conduct the abovementioned transactions since it has professional management and there is substantial financial advantage to be achieved for it.

A Calculation Example

To continue with the abovementioned example, the IEF purchases a property portfolio with a total (indexed) annual income of 200 million guilders from a pension fund and pays a sum of 2.6 billion guilders for this. One minute after purchase, it sells back the property portfolio, agreeing a transfer date 30 years ahead, for a purchase sum of 2.6 billion guilders plus a percentage to be agreed for the increase in value. At the same time it sells (assigns) the right to the receipt of the annual, inflation-linked increase in rent for 30 years for a sum of 600 million guilders.

The IEF must therefore pay a sum of 2.6 billion guilders to the pension fund for the property portfolio purchased, but has to receive a sum of 600 million guilders from the pension fund as the purchase price for the inflation-linked increase in rent to be handed over during the next 30 years. The IEF must therefore pay 2 billion guilders to the fund.

In this example it is assumed that the IEF has no funds of its own and has to borrow 2 billion. The IEF borrows 2 billion from a bank for a period of 30 years at a fixed interest rate of 6% per year (current interest rate). As security the IEF gives the bank a right of mortgage on the property portfolio which not only has a market value of 2.6 billion but which will also be purchased by a pension fund (eternally enduring status) for a sum of at least 2.6 billion guilders. The 2 billion loan can be paid back in its entirety from this purchase sum and therefore the IEF has to make no interim repayments on the loan.

The IEF receives annual revenues of 200 million (after all, everything collected over and above the inflation-linked increase in rent will be passed on to the fund) and annual costs of 6% interest, i.e. 120 million. The costs of maintenance, management, insurance, etc. are estimated to be approximately 15% of the rental income, that is to say 30 million per year. Therefore, it will be able to generate a profit of 200 million–120 million–30 million=50 million per year. However, the profit will slowly decrease as a result of rising costs.

Even if this profit is only 25 million per year, we must that this is only one transaction. The true profit for the IEF is that trading in inflation has been established and that this proceeds via the IEF. After all, the pension funds will probably follow one another in this transaction. The large funds will probably do this because they would otherwise be outperformed and smaller funds because holding a small property portfolio is (too) expensive.

The IEF must soon be capable of binding to itself 20% (12 billion guilders) of the estimated 60 billion guilders worth of property held directly by pension funds in The Netherlands. As a result the IEF will, in particular, become one of the largest property owners in the longer term, as a result of which even more professional management (research, market positions, salaries) can be attracted and a better position will be generated with, as a consequence, better conditions for tenants, contacts, local authority, etc. Ultimately this will also lead to an increase in the value of the portfolio. Large-scale, more professional management, better quality property and spreading of risk are keywords here.

Property Split into "Bricks-And-Mortar Component" and "Inflation Component"

In addition to transactions as described above the IEF will also be a bidder for property portfolios which are for sale in the ordinary way. It will then be the only party to know what the CAP and the BOX worth are. In other words, only the IEF knows what inflation exchange contracts (IECs) yield and it will as a rule then also be able to pay more for the property than other parties who establish the value of the property in the conventional manner on the basis of interest, depreciation, etc.

The IEF has actually split the property into an inflation component and a bricks-and-mortar component, the two components having a greater value apart than together. After all, the BOX component (i.e. the owner of the bricks and mortar where the initial rent is not increased for, for example, 10, 20 or 30 years) can also be very attractive to many parties. After all, the purchaser of the BOX, the bricks-and-mortar component, is purchasing property which has a certain high initial yield, the uncertain inflation component following only in the (long) term.

Therefore, as a consequence of the invention that inflation can be traded separately, property will never again be looked at in the traditional manner but will be considered as property that has a bricks-and-mortar and an inflation component.

The bricks-and-mortar component will be managed by property managers who will apply themselves to what they ought to be able to do well, namely add value; a rise in value as a consequence of inflation is after all not something for which the property managers can claim credit.

For the invention of trading in inflation, property is important for starting up trading in inflation. As a consequence of the property to the value of approximately 60 billion directly in the hands of institutional proprietors in The Netherlands, as already mentioned above, a respectable level of trading will be obtained even if only some of the proprietors conclude the transactions described above with the IEF.

However, it is not necessary to link trading in inflation to trading in property, as will be explained below.

Trading in Inflation not Linked to Trading in Property

It is very certainly not the case that the ownership of property, or a bricks-and-mortar component, is a precondition for the existence of trading in inflation, or trade in IECs. As explained above, property can serve for the provision of security, for compliance with an obligation actually to pay inflation for a specific period on a specific agreed sum to the purchaser of the IEC. After all, the security lies in the assignment of the annual-inflation-linked-increase in rent.

Strictly speaking, of course, the provision of other security for compliance with the obligation resulting from an IEC is also readily conceivable. For instance, it is conceivable that companies—in the first instance probably large multinationals—would be very interested in wanting to cover a specific sum against inflation for a specific period. As has been stated, security for this purpose does not have to be property-linked but, of course, can also be other security, such as currency, mortgages, Group guarantee, etc.

An oil company can serve by way of example.

Inflation cover is an asset: an example. Assume that the oil company wishes to attract funds in order to make a new high-risk investment. It is true that the company, just like institutional investors, will be able to borrow money, but the borrowed funds are not always allowed to be invested in or used for a high-risk venture. Loans are also specified as such on the balance sheet and it is certain that they have to be repaid.

Now that trading in inflation exists it is possible that this company will offer the IEF inflation cover on a sum of 200 million for 15 years. The IEF will pay a purchase price for this. The IEF sells the inflation cover on to a fund or creates a "back-to-back" transaction. The IEF also draws up the conditions (think of security) for the inflation exchange contract.

The advantage for the IEF is clear.

There are also only advantages for the oil company. Firstly, the company is found to be able to sell something which it was not aware it possessed. In short, inflation cover is an asset. Secondly, the purchase price received is not a loan but a revenue which therefore can be invested in a high-risk venture. This is offset by an uncertain financial obligation over a number of years for which a reserve can be made offset against tax, which postpones corporation tax with interest advantage as the result. Thirdly, for example, the oil price is also "inflation-linked", so that higher inflation does not by definition have to mean a disadvantage for the company.

Incidentally, there are also more inflation-linked products: in addition to oil, gas and water prices are often also inflation-linked.

But even without any underlying inflation-linked product, companies can, if adequate security is given, attract capital in exchange for the obligation to cover inflation.

After all, all companies which have now borrowed money at a (short-term) flexible interest rate already take account of the fact that their obligation to pay interest can vary substantially. It is no different in the case of inflation payment since inflation and interest continually influence one another; in other words trading in inflation may be novel but the response to a fluctuating financial multi-year obligation is already very common.

In view of the substantial fear and need on the part of the institutional parties in The Netherlands, the UK, Germany and the USA alone, the demand for inflation cover would already frequently exceed supply and an interesting price will therefore be offered to purchasers of the IECs.

In addition to companies and institutional parties, consideration can also be given to central banks and states, which can be either purchasers or sellers. After all, states also often enter into inflation-linked obligations; consider, for example, the installation of a high-speed railway, the purchase of aircraft, tanks and the like. There can be a need to reduce budget deficits by means of the sale of inflation cover. Note that the sale of IECs is something very different to attracting funds by the issue of bonds.

Finally, private individuals will also be able to turn to the IEF for a lump sum in return for a multi-year obligation by means of covering inflation on smaller sums for shorter periods. Consideration can be given to covering sums of the order of magnitude of NLG 10,000 for a period of, for example, 3 to 5 years.

In view of the fact that salaries are already frequently raised annually by the rate of inflation in order to maintain purchasing power, security could, for example, also be given by this cover. All people who have bank accounts can then trade easily via the IEF, in which banks can also participate. After all, trading in IECs is no more difficult than trading in shares or currencies or trading in any other options (futures trading).

The differences in perception, in future expectations with regard to whether inflation will fall or rise, which are needed to allow any trade to flourish is a fact separate from the difference in appreciation described above (institutes, for example, value inflation cover appreciably more highly than, for example, private individuals).

After all, whether or not there will be inflation fluctuations in the future depends on a very large number of circumstances which each individual will weight differently. Trading in IECs will therefore result as a consequence of the need for hedging, speculation and arbitrage.

Trading in Inflation World-Wide

It is self-evident that it is possible to cover, and therefore to trade in, various inflations. Consideration can be given to those in Europe, the USA, the UK, Asia, etc. Just as in currency dealing, a gigantic world market will therefore be able to arise where states, banks, institutional organisations and multinationals "match" their respective interests with associated inflation cover. The abovementioned parties will often act as purchasers but in view of the international interests and possessions of precisely these parties they will also act as sellers, driven to this by the financial advantages and arbitrage. Central banks which currently still have only the interest rate as a weapon against inflation then also have the option of large-scale purchase or selling of IECs.

Risks for Purchasers and Sellers of IECs

Is there a Major Risk for the Purchasers of IECs?

After all they have spent a one-off sum based on an inflation expectation which could be too high. This will not apply in the case of, for example, institutional parties, who will frequently be the purchaser of IECs, since, in the inconceivable situation that inflation remains at zero for 30 years, the theoretical situation arises that (see above example) 600 million guilders has been paid for the purchase of an IEC which, as a consequence of no inflation, yields 0 guilders. The institutes which have invested the bulk of their funds in government bonds and shares will then be very pleased here since no inflation guarantees a high share and bond value. The abovementioned 12% will then probably be achieved.

However, what is even more important is that if there is no inflation the obligation to pay index-linked pensions to those entitled to a pension will then also nominally not have increased over 30 years.

Purchasing IECs on the one hand and investing in shares and government bonds on the other together then also appears to be the solution.

Of course, securities matching the obligation must be agreed in the IEC.

Is there a Major Risk for the Sellers of IECs?

This will not apply, for example, in the case of those parties who, in addition to the purchase price obtained, also have possessions which as a rule also rise in value with rising inflation. For instance, all those who own their own house will as a rule see its value rise as inflation increases. Consequently they are able, if necessary, to attract additional capital in order to meet their payment obligations arising from the IEC. Granting a second mortgage in respect of the rising value can already be a simple form of security. This also applies for companies. An additional aspect here is that the sellers have (had) the purchase price of the IEC freely at their disposal.

The securities which must be given in order to participate in inflation trading will therefore be more or less the same as the current security for trading in options and futures.

The Purchase Price for an IEC

In practice a great deal of attention will be paid to calculation of the level of the purchase price for an IEC. All participants will, each individually, attempt to predict future inflation by means of calculations. Both the pension fund and the IEF, for example, make an estimate of the annual inflation to be expected over a specific term. We refer to this as the theoretical purchase price for an IEC.

The Theoretical Purchase Price

The theoretical purchase price is made up of the estimated cash value of the cumulative rise due to inflation per unit time (for example per year) for the period for which the IEC has been agreed (for example 30 years) over the sum of money covered. This sum of money has been referred to as the CAP in the description above.

For calculation of this theoretical purchase price it is therefore important to know:

future inflation per year (hereinafter designated inf);

future interest rates per year (hereinafter designated int) against which a cash value can be calculated.

Because the future annual inflation and also the future annual interest rate are not known, assumptions will have to be accepted for these. The way in which the most probable assumptions for the future annual inf and int can be obtained via stochastic models and probability calculation models is assumed to be known.

What is concerned here is the theoretical purchase price for the CAP or the inflation cover, which is also referred to as the IEC.

In the light of the above, this purchase price (also referred to as P (price)) is in any event dependent on the value which is covered against future inflation (also referred to as coupon value or CV);

the future annual inflation inf. The inflation in year 1 will be designated as inf1; in year 2 as inf2, etc.;

the future annual interest rate at which cash can be obtained, int. The interest rate in year 1 will be designated as int1; in year 2 as int2, etc., and the term in years.

An index (hereinafter: I) by which the value to be covered, the coupon value (CV), has to be indexed will also be calculated. The index for year 1 will be designated as I1, year 2 as I2, etc.

Mathematically the index for a period of x years is represented as Ix and the theoretical purchase price for an IEC with a term of x years as Px.

The index in year 1 can then be formulated as follows:

| | |
|---|---|
| In year 1: | I1 = 1 + inf1 |
| In year 2: | I2 = (1 + inf1)(1 + inf2) |
| In year 3: | I3 = (1 + inf1)(1 + inf2)(1 + inf3), etc. |
| In year x: | Ix = (1 + inf1)(1 + inf2), . . . (1 + infx) |

The CAP, or the cumulative inflation cover to be paid for the entire term of the coupon value, can be calculated as follows.

For year 1 the CAP is:

$$CAP1 = (I1-1) \times CV$$

For year 2

$$CAP2 = \{(I1-1)+(I2-1)\} \times CV$$

For year 3

$$CAP3 = \{(I1-1)+(I2-1)+(I3-1)\} \times CV$$

And in year x is $$CAPx = \{(I1-1)+(I2-1)+(I3-1) \ldots (Ix-1)\} CV$$

or, formulated more generally, the CAP in year x is:

$$CAPx = CV \cdot \sum_{i=1}^{x} (I_i - 1)$$

In order to calculate the (theoretical) purchase price for the CV the value of the CAP must finally be converted to cash, the interest rate in year i being designated $int_i$. This leads to the following general formula for the price in year x:

$$Px = CV \cdot \sum_{i=1}^{x} \frac{(I_i - 1)}{(1 + int_j)^i}$$

(for a worked calculation example see below under Internet (the private individual)).

Via these formulae it is possible, making use of the correct probability calculations for the future inf and $int_i$, to calculate the theoretical purchase price, or the price of the IEC. The theoretical price will then lead to an actual (market) price depending on a number of influences. These influences are the same as all the influences which determine the supply and demand for the need for inflation cover, for example the risk of property standing empty, inflation expectation elsewhere in the world, political instability, etc.

It is interesting that supply and demand can arise both on the basis of the need for hedging, and on the basis of speculation and on the basis of arbitrage. A price from the need for hedging, speculation and arbitrage will be calculated, each individually, not only for term and coupon value but also on the basis of various currencies and various continental and national inflation rates or inflation rates defined in some other way.

Knowledge for the calculation of the value of an IEC can be obtained in greater depth on the basis of the formula presented above and the trade can be given direction.

An example of this is the calculation for an IEC which has a term which does not start in year 1 and run to year x but, for example, starts in year 18 and runs to year 18+h, where h<x-18. Incidentally, countless examples can be conceived.

An example of a derived calculation in respect of the possible advantages and disadvantages for a purchaser of an IEC and the consequences for a seller of an IEC and, furthermore, the economic proprietor of a property portfolio for 30 years (see the example of a pension fund described above) is appended, in which example it has also been assumed that from year 7 20% of the property portfolio is unoccupied and this percentage remains unchanged for 23 years, or that there is a permanent fall of 20% in the value of the property portfolio which is not reversed over 23 years.

Trading in Inflation with the Aid of Computers and/or Via the Internet

The invention can be supported with the aid of a computer which is able to perform the necessary calculations, which have been described above, for trading in inflation.

Figure 6:
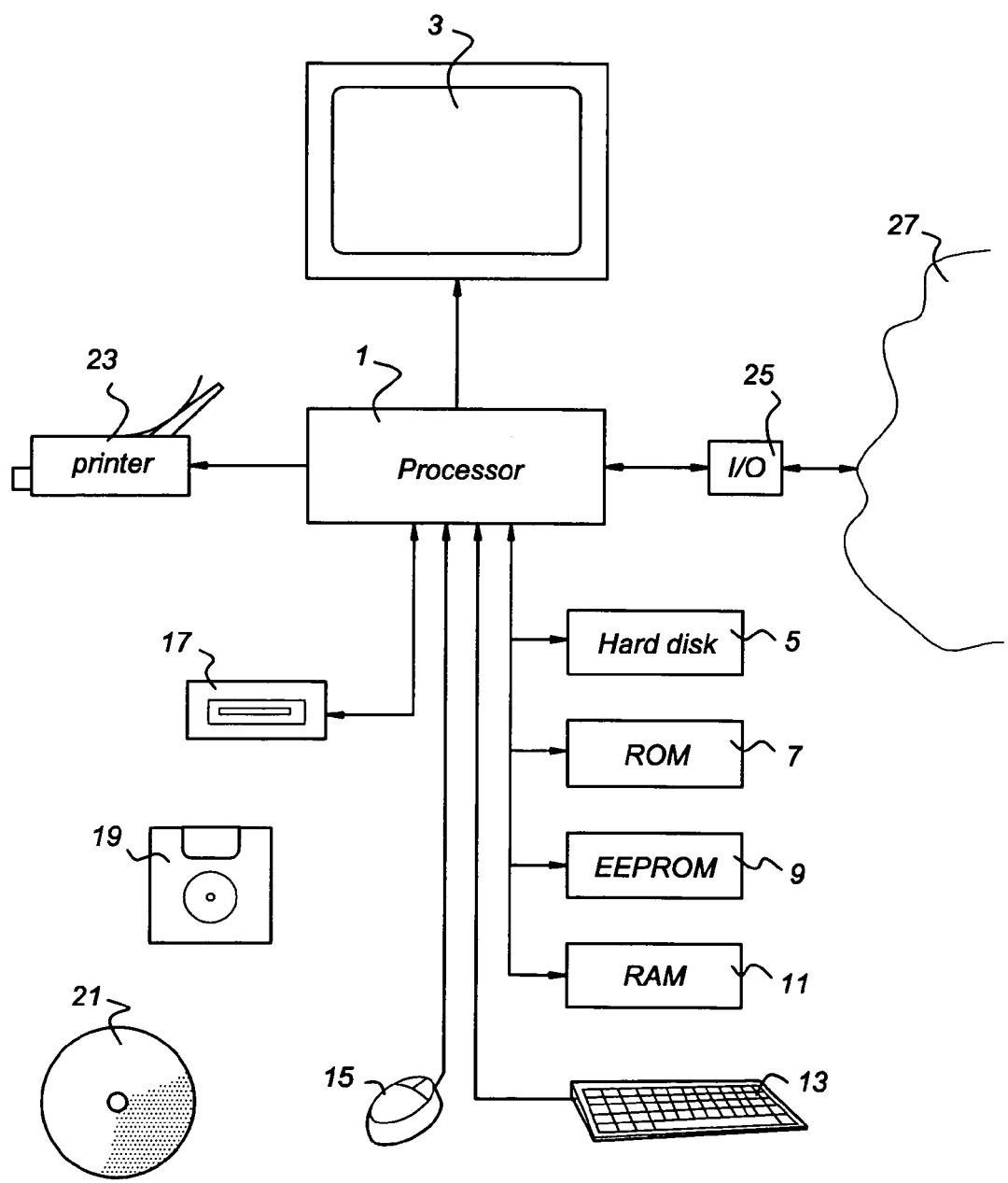
FIG. 6 shows a computer configuration by means of which the invention can be supported.

FIG. 6 shows a computer installation 1 with a processor 2 for performing such mathematical processing.

The processor 2 is connected to a number of memory components, including a hard disk 5, read only memory (ROM) 7, electrically erasable programmable read only memory (EEPROM) 9 and random access memory (RAM) 11. Not all these types of memory necessarily have to be present. Moreover, they do not have to be located physically close to the processor 2. They can also be located remotely therefrom.

The processor 2 is also connected to means for inputting instructions, data, etc. by a user, such as a keyboard 13 and a mouse 15. Other input means, such as a touch screen, a track ball and/or voice converter, which are known to those skilled in the art, can also be used.

A reader 17 connected to the processor 2 is provided. The reader 17 is equipped to read data from and optionally to store data on a data carrier, such as a floppy disk 19 or a CD-ROM 21. Other data carriers can be, for example, DVDs, as is known to those skilled in the art.

The processor 2 is also connected to a printer 23 for printing output data on paper, as well as to a display unit 3, for example a monitor or LCD (liquid crystal display) screen or any other type of display unit known to those skilled in the art.

The processor 2 is, for example, connected to a communications network 27, for example the PSTN (public switched telephone network), a local area network (LAN), a wide area network (WAN), etc., by means of input/output means 25. The processor 2 can have been equipped to communicate with other communication installations via the network 27.

Other computers (for example PCs) (not shown) are able, for example, to log in to the processor 2 via the network 27.

The processor can have been implemented as a stand-alone system or as a number of processors operating in parallel, each of which is equipped to perform sub-tasks of a larger program, or as one or more main processors with various sub-processors. Some of the functionality of the invention can even, if desired, be carried out by processors located remotely which communicate with processor 2 via network 27.

The configuration according to FIG. 6 is provided with software in the memory in order to enable the processor 1 to perform the necessary calculations. To this end values for the (expected) inflation rates $inf_i$ and the (expected) interest rates $int_i$ are stored in the memory, whilst the user is able to enter the desired value for the coupon value CV.

In a preferred embodiment trading in inflation can take place via the Internet. The set-up shown in FIG. 6 then shows a server which can be accessed via the Internet and can provide the necessary functionality. Various websites will have to be developed as user interfaces. This is not discussed in more detail since it is assumed to be known to those skilled in the art.

It has been explained above who can participate in trading in IECs. In principle, the participants can be subdivided into a number of groups which have different profiles. Consideration can be given to states, central banks, banks, institutional investors;
multinationals, companies and other legal entities with substantial equity capital;
smaller companies and legal entities with low equity capital and all private individuals.

Of course, other profiles are also conceivable. What is important, however, is that the abovementioned groups are so numerous that, although trading in IECs can be carried out in a different way for each group (see below), the Internet appears to be an excellent medium for this new trade.

A first initiative for, and a brief explanation of, how trading in inflation via the Internet is conceived in general and can differ per group will be given below. The explanation is intended solely by way of example and not as a limitation of the invention.

An Auction or an Exchange?

Trading in IECs is standardised in value level (coupon value) and length of term. Using the formula given above and the forecast inflation $inf_i$ and expected interest rate $int_i$, the IEF will calculate daily the theoretical value of the existing standard IECs. It will publish a theoretical purchase price and sale price.

The IEF has opted for an exchange form because it is able, via the calculation of a theoretical value, to indicate a purchase price and sale price which can be seen via the Internet and to separate supply and demand.

The "Internet exchange" then functions more or less in the same way as existing trade on the stock exchange and options exchange, in which context the actual purchase and sale prices will be published via the Internet as soon as trading has got underway.

The IEF Standard Products

What Inflation and what Series?

In the first instance the IEF will, for example, deal in four different inflation coupons, i.e. the coupons which
cover inflation in Europe,
cover inflation in the USA, cover inflation in the UK,
cover inflation in Japan.

These coupons can subsequently be further differentiated according to the different inflation rates (series) per region, but initially one inflation rate will be selected by the IEF.

For example, a selection can be made from the consumer price index totals for the following series:
all households,
all households derived,
employees, low,
employees, low derived,
employees, high,
employees, high derived.

The IEF establishes which series will be chosen per region and this will be specified on the coupon.

What Currency?

"Linked Coupon"

The IEF then establishes the coupon currency per coupon.

In the first instance a sum in Euros will also be covered in the case of the "European inflation" coupon and a sum in dollars will also be covered in the case of a "USA inflation" coupon, etc.

For example,
a sum of Euro 100,000 is covered for x years against inflation in Europe;
a sum of $100,000 is covered for x years against inflation in the USA.

"Mixed Coupon"

Later on the IEF will trade in derived products where the currency risk is introduced and it will be made possible to trade in coupons where, for example, a sum of $100,000 is covered for x years against the inflation in Europe.

Two inflation rates are then, as it were, working against one another.

The "mixed coupons" will be brought in particular by parties who are involved with a mix of currencies and associated inflation rates. Via these coupons the effects of, for example, inflation in the purchaser's own currency will be covered against inflation risks elsewhere.

It should be clear that in the course of time it will be possible that it is no longer only the Euro, Dollar, Pound or Yen currencies that can be brought onto the market as coupon currencies but that all currencies can be traded in IEC coupons.

Coupon Value

Initially there will be a low and a high coupon value, the IEF determining per group of participants up to what coupon value a certain party may purchase an IEC.

Different requirements for being able to underwrite/sell an IEC apply for each group. In principle anyone can purchase an IEC.

The following coupon values will be introduced by the IEF:

10,000 (ten thousand)

10,000,000 (ten million)

Terms

The coupon term will also vary from the short to the long term, where the shortest term for cover will be 3 years and the longest, for example, 30 years.

Here again certain groups (profiles) will be excluded by the IEF from, in particular, selling an IEC with a longer term coupon value.

The following terms will be introduced by the IEF:

3 years 5 years 10 years 20 years 30 years

How it Works

Supply and Demand, Purchasers and Sellers

The buyers, the purchasers of the IEC, will in the first instance probably be institutional parties. In view of their interests and highly liquid positions they will be approached as pace-setters for the trade and will be capable of calculating and overseeing the substantial advantages. They will give concrete form to the demand for IECs by, inter alia, price setting, (see theoretical value of IEC) and a package of requirements which would have to be met by an IEC. For the purchasers, who pay a lump sum for an IEC, it will be extremely important that they have (sufficient) confidence that the seller/underwriter of the IEC (i.e. their contracting party) will also actually pay the annual inflation on the coupon value throughout the agreed term.

The IEF itself can act as contracting party, but other parties who are admitted by the IEF to participate as sellers in trading in IECs are also able to do this.

The abovementioned buyers, the institutional parties, will in principle wish to have major amounts covered against inflation for a long term. They will therefore place orders to cover tens if not hundreds of millions of guilders (Euros, Dollars, etc.) against inflation for, for example, 20 or 30 years, if possible.

They will therefore issue orders to purchase multiple coupons with a value of 10 million for, for example 20 or 30 years. Of course, as the other party they will only accept "underwriters" of the IEC who have been specially selected by the IEF for this purpose. As an alternative, the IEF will itself act as contracting party. Purchasers will be informed in advance in a profile of the selection criteria for the IEF to permit a party to underwrite such IECs. The purchasers must agree to this profile in advance.

The Role of the IEF

In addition to an investigation—the same as that usually carried out by banks into parties who borrow large sums for long terms or enter into other future financial obligations (options or futures trading)—the IEF will also investigate the securities and formulate and test the requirements and standards with which the underwriting parties, the sellers of the IEC, have to comply.

They will also set the standard for the inflation exchange contract in which the securities and any penalties are very accurately described. The IEF will publish the names of the parties who comply with the requirements they have drawn up. These will therefore be parties which have such a large equity capital and in which, in view of experience and status, there is such confidence that they will be generally accepted as underwriters. These can be states, major insurance companies, multinationals or other institutional parties or a joint venture made up of these. As has been stated, the purchasers of IECs will be able to inspect this list in advance and agree to the parties listed.

Parties who wish to participate in trading in inflation will be able to register via the Internet. They will then contact the IEF via the Internet.

Purchasing parties will only have to demonstrate that they have sufficient funds available to pay the purchase price of an IEC as a lump sum.

Selling parties will have to meet a number of profile requirements. After having complied with the abovementioned profile requirements, purchasers and sellers are given an access code and are thus allowed to trade by the IEF. The purchasing party is given a limit equal to the capital it has available to pay the one-off purchase price. For the selling, the underwriting, parties a limit is calculated up to what sum and up to what term they are allowed to underwrite.

One of the conditions will in any event be the possession of a bank account with the IEF or with a generally recognised banking institution working together with the IEF.

After the parties who wish to purchase or sell an IEC have then registered with the IEF by means of the access code, they are given, in addition to the (sale and purchase) rates (which are visible to all who visit the site), the opportunity of placing an order up to the limit and actually proceeding with purchase or sale.

The purchase and sale rates include commission for the IEF. The IEF can also be one party in the transaction, but this does not have to be the case and in the majority of transactions it will not take any position itself. In short, it functions as a bank and makes use of the know-how customary for trading.

Since an exchange does not yet exist, this will be set up by the IEF and supervision will be provided so that trading proceeds in an orderly fashion and correctly in accordance with the law. Thus, exchange rules will also be drawn up and in addition everything necessary will be done to ensure trading proceeds correctly.

Just as there is a "limit" system which works well for, for example, credit cards, exchange rules which work well also already exist. These therefore do not have to be conceived afresh here.

The IEF therefore functions as a bank and exchange.

Trading by Private Individuals

Trading in inflation for private individuals has the major advantage that private individuals will become aware—just like the oil company in the abovementioned example—that they are able to sell something, able to turn something into cash, where they did not know that they possessed "this something". This "something" is the ability to cover inflation in the future. In other words, in addition to owning one's house, a car or other possessions, one has "the ability to cover inflation" and one can sell "this ability to cover inflation", and turn it into cash, by means of underwriting—concluding—an inflation exchange contract via the Internet.

A private individual can access the IEF server (FIG. 6) via the Internet and read information on trading in inflation.

The Private Individual as the Purchaser of IECs

As a purchaser all the private individual has to do is to keep the purchase price he/she is to spend on deposit with the IEF or a banking institution affiliated with the IEF.

The Private Individual as a Seller of IECs

If the private individual decides to participate as the seller of an IEC and therefore decides that he/she wishes to cover a certain sum against inflation for a number of years, he/she must meet a profile to be drawn up by the IEF. Information on this can be requested via the Internet. This information will include a number of requirements, a few examples of which are given below:

holding a bank account with the IEF or a banking institution affiliated to the IEF;

being in employment or having another source of fixed (future) income;

owning one's own house or other property;

possessing own capital (deposit account, share portfolio, etc.)

insight into financial position (debts, etc)

(in short: more or less the same degree of openness in respect of financial affairs must be provided as in situations where private individuals ask a bank for a loan or wish to participate in options or futures trading).

After the above information has been provided, the private individual will be informed by the IEF whether or not he/she can participate, optionally with certain conditions being applied, in trading in inflation. If this is the case the private individual is given an access code and a limit.

An Example

Someone
- earns 80,000 per year and is a civil servant;
- owns his own house worth (valuation) NLG 380,000;
- has a debt (mortgage) of NLG 280,000;
- is 40 years old, healthy, has no criminal record, has never been declared bankrupt, etc.

The IEF issues an access code and the private individual signs a document assigning his future salary rises up to the percentage of inflation per year and the IEF provides a second (additional) mortgage of NLG 500,000 on his house. His limit is then, for example, 10-year coupons up to a total coupon value of NLG 40,000.

For an average annual inflation of 2.5% and an interest rate of 5.5% for conversion into cash, this leads, in accordance with the calculation of the theoretical purchase price described above, to the following calculation of the theoretical purchase price.

$$P10 = 40,000 \cdot \sum_{i=1}^{10} \frac{(41.025^i - 1)}{(1 + 0.055)^i}$$

$$P10 = 40,984$$

He then pays the following amounts per year:

| Year 1 | 0.025 × 40,000 = | 1,000.00 |
|---|---|---|
| Year 2 | 0.05062 × 40,000 = | 2,024.80 |
| Year 3 | 0.07689 × 40,000 = | 3,075.60 |
| Year 4 | 0.1038 × 40,000 = | 4,152.00 |
| Year 5 | 0.1314 × 40,000 = | 5,256.00 |
| Year 6 | 0.1597 × 40,000 = | 6,388.00 |
| Year 7 | 0.1886 × 40,000 = | 7,544.00 |
| Year 8 | 0.2184 × 40,000 = | 8,736.00 |
| Year 9 | 0.2488 × 40,000 = | 9,952.00 |
| Year 10 | 0.2801 × 40,000 = | 11,204.00 |
| Total | | 59,332.00 |

That is to say, he pays by (partly) surrendering the correction to his salary for inflation every year. The securities are therefore more than adequate and the private individual can, for example, purchase a new car without having borrowed money. From the tax standpoint the 40,984 obtained is not income since it is offset by a 10-year uncertain financial obligation.

In the light of the annual salary rises linked to inflation on the salary of 80,000, the annual amounts to be paid equal to the inflation on 40,000 can be paid by the private individual. Should there be years in-between where inflation is extremely high, the amounts to be paid annually by the private individual could rise sharply. These should be offset by a substantial rise in salary as well, but this does not affect the issue that the private individual could then experience problems in meeting his annual obligation resulting from the IEC.

It is precisely for this situation that the IEF has a second mortgage on the private individual's house, which will also have risen in value as a result of the same extremely high inflation.

It would be going too far here to discuss all variants which can be agreed between the IEF and the private individual in order to cover the security required by the IEF—which itself assumes a position in these transactions. Nevertheless, a few variants will be outlined briefly below.

Assume that the private individual does not own his own house. A limit of NLG 20,000 coupon value could then be considered. His salary—which, for example, can be paid via the bank affiliated to the IEF—will then rise annually by more than 4 times his annual obligation to pay inflation.

Another possibility can be to hold the cash value of the two final (and highest) payment obligations to be paid in a deposit account for the private individual with the IEF. In other words, a deposit of $$\frac{11,204}{(1 + 0.055)^{10}} = \frac{11,204}{1,708} = 6,559.00$$

could be held to cover the obligation to pay NLG 11,204 in year 10 and $$\frac{9,952}{(1 + 0.055)^9} = \frac{9,952}{1,619} = 6,147.00$$

to cover the possible obligation in year 9. The private individual could then receive a sum of (40,984−6,559−6,147)=NLG 28,278 in cash from the sale of his IEC and a sum of (6,559+6,147)=NLG 12,706 in a deposit account blocked for 10 years with the IEF, with interest payable at 5.5% per year.

Of course, the IEF will also calculate a substantial margin for this transaction in order to cover the risk and to make profit.

In the case under consideration a margin of 10%, that is to say NLG 5,000, can be considered on the part of the selling party. The transaction is still more than interesting to the private individual and also to the IEF or the bank affiliated to the latter, also bearing in mind the spin-off as a consequence of holding a bank account with the IEF or the bank affiliated to it.

The IEF then sells this IEC, which it then underwrites itself for, for example, NLG 5,000 above the theoretical purchase price. If the IEF concludes tens of thousands of such transactions—and this is certainly possible via the Internet—the profits become phenomenal and the risks decrease.

Another possibility is that the IEF purchases short-term coupons every year and itself underwrites longer-term coupons and also purchases multiple coupons of lower value and underwrites coupons of higher value. In the light of the high and different margins, this is an attractive position.

The Structure and Technology of the Website

Overview of Web Pages

Figure 7:
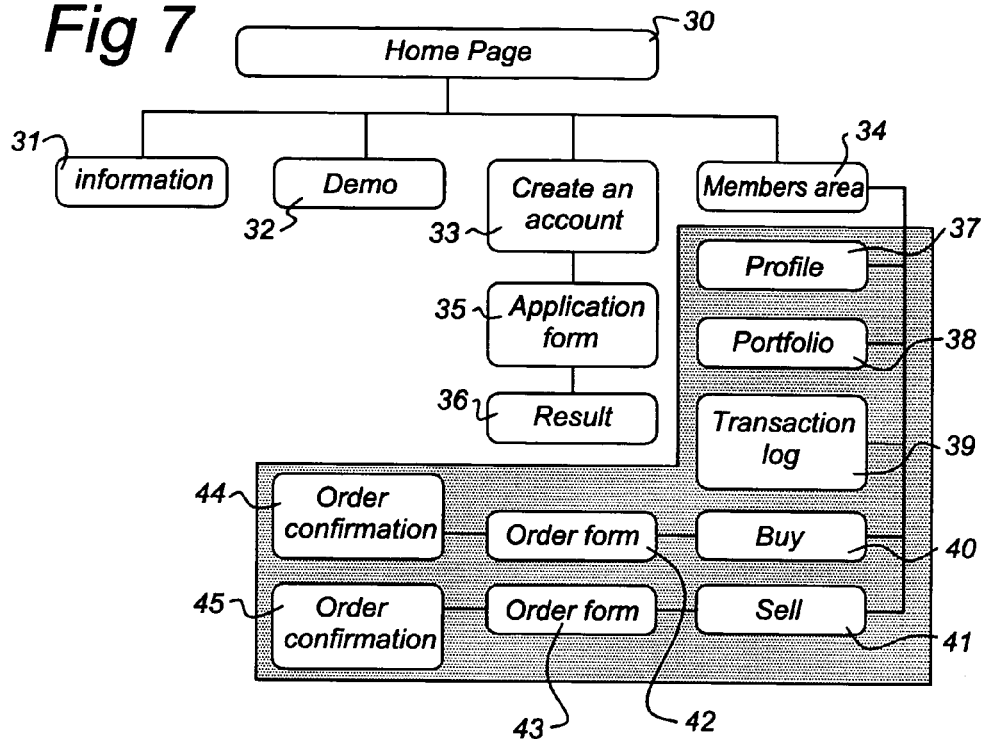
FIG. 7 shows a structure of a website by means of which the invention can be supported.

The area of the website with a grey background in FIG. 7 is the so-called 'restricted area'. The website pages belonging to this area can be accessed only if the user is in possession of a valid identification code and a valid password.

In addition to the above pages there is also a page on which the terms used are explained. This page can be called up from any other page.

Figure 8:
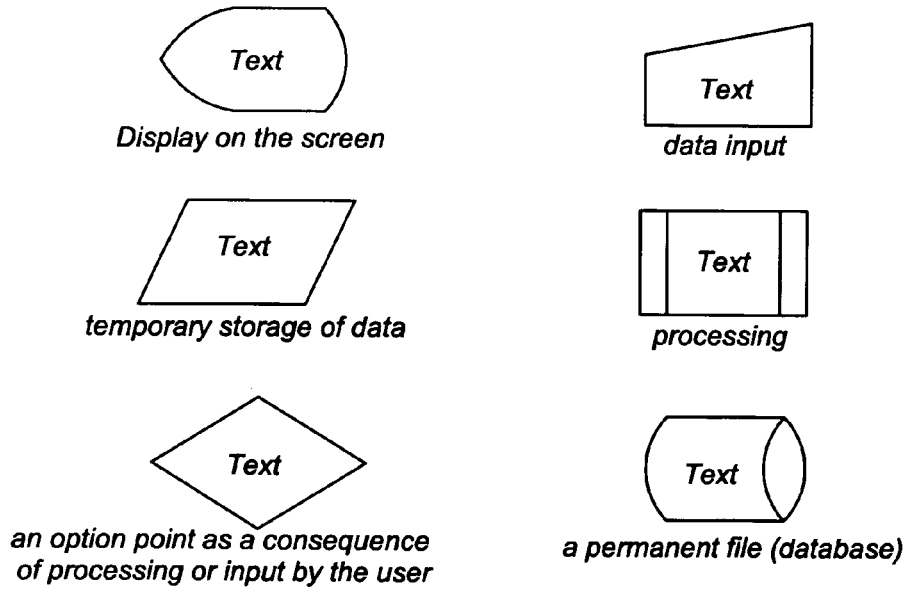
FIG. 8 shows an explanation of the symbols used in the flowcharts in FIGS. 9–16.

An overall description of each page is given in the paragraphs below. If relevant, the processing of (entered or retrieved) data is shown graphically by means of flowcharts. The notation used for these is as explained in FIG. 8.

The following permanent files are used and are stored in one of the memories of the set-up shown in FIG. 6:

User Profiles (user profile data: limits, password, etc);
Outstanding Orders (outstanding purchase orders and orders for sale);
Active Orders (contracts not yet completed);
Transaction Log (log of purchase orders, orders for sale and lapsed orders);
Activity Log (log of user activities).

The Home Page 30

The Inflation Exchange Home Page 30 welcomes visitors to the site. The information displayed on the page includes, for example, the following:

a table of current coupon return rates;
a graph showing an overview of the 3-year index for the past two months;
the difference between today's rate and yesterday's rate;
a summary of the latest news on topics related to inflation.
The following pages can be called up from the home page 30:
information 31;
demonstration 32;
creating a new account (registration) 33;
access to the 'restricted area' or the members area 34.

The Information Page 31

On the information page 31 the visitor can obtain more information on:

what the Inflation Exchange is;
what inflation is;
how to trade on the Inflation Exchange;
an example of trading in inflation on the Inflation Exchange.

The Demonstration 32

Figure 9:
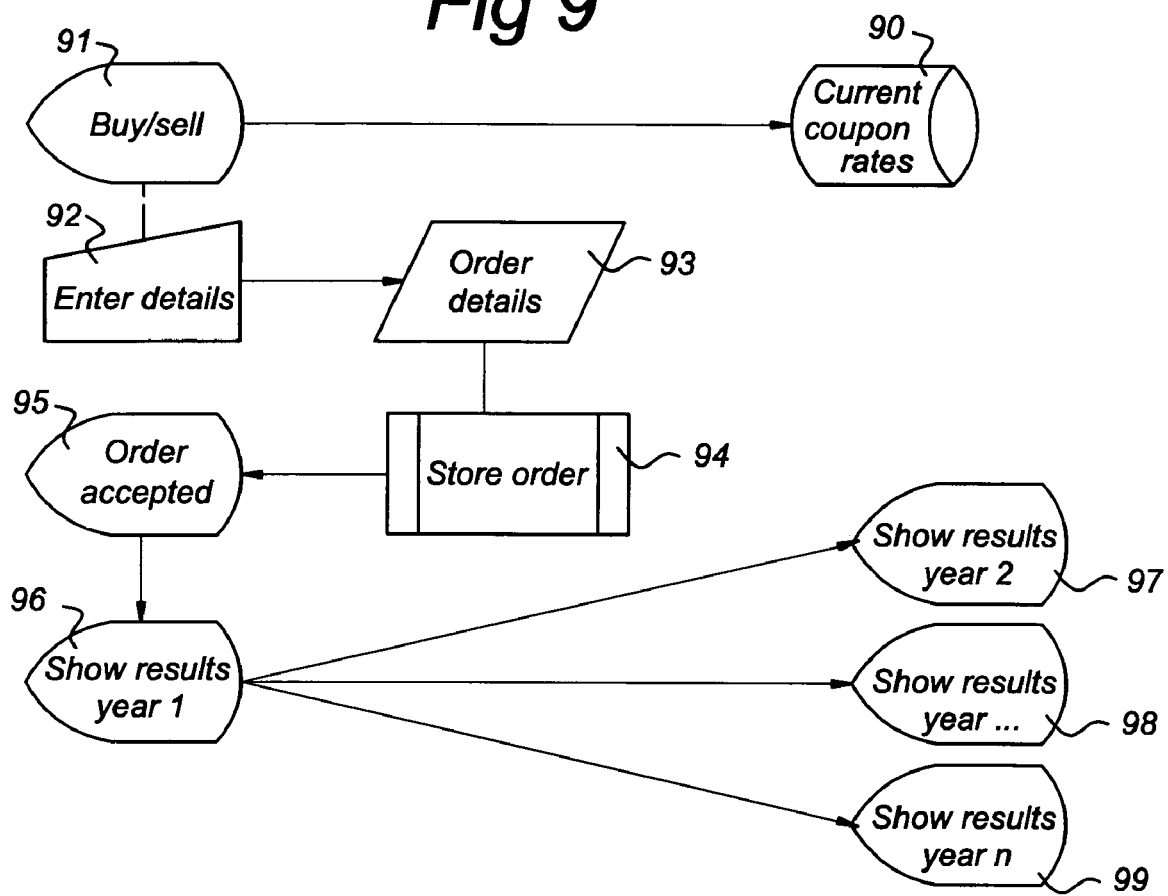
FIGS. 9–16 show a few flowcharts of software that can support a website.

With the aid of the demonstration 32 a visitor to the site can try out how trading via the Inflation Exchange functions. A visitor can place fake orders and view the notional result over a prolonged period. The various aspects are explained in FIG. 9.

Notional Buying and Selling [91]

In step 91 the user is presented with a choice of placing a notional purchase order or order for sale. Depending on the result of this choice, the visitor fills in the details for the purchase order or order to sell; step 92. The current coupon rates from the 'current coupon rates table' 90 are displayed on the screen.

Details of Notional Purchase and Sale [92–93]

A form is displayed which allows a visitor to place a notional purchase order or order for sale. In step 93 the order details are transmitted to the application server.

Validation of Purchase Order and Order for Sale [94–95]

The details of the notional purchase order or order for sale are validated. Because the order is a notional order this will always be accepted and stored, in steps 94 and 95, and the visitor will receive a message that his/her notional purchase order or order for sale has been accepted. The visitor is given the option of clicking to display the following screen, step 96, showing the revenues and obligations for the notional purchase order or order for sale throughout the term at a notional actual percentage inflation rate.

Results During the Term [96–99]

In step 96 the visitor is shown the results of his/her notional purchase order or order for sale at a notional percentage inflation rate. The visitor is thus able to determine what the financial consequences of placing such an order could be. The visitor starts with the results for the first year, step 96, and can continue to see the results for one year later, steps 97–99, until the end of the term of the notional order has been reached.

Creating a New Account (Registration) 33

A visitor can register for an account with the Inflation Exchange via the website. By filling in a form the limit to which this visitor may trade is calculated. The visitor is then assigned a temporary user ID with which the visitor can place fake orders. The visitor also receives a contract, preferably by e-mail. As soon as the visitor has printed out the contract and has signed and returned it to the Inflation Exchange his/her temporary user ID is converted to a permanent user ID and the visitor can place actual orders. Of course, the visitor receives confirmation of this by e-mail.

Figure 10:
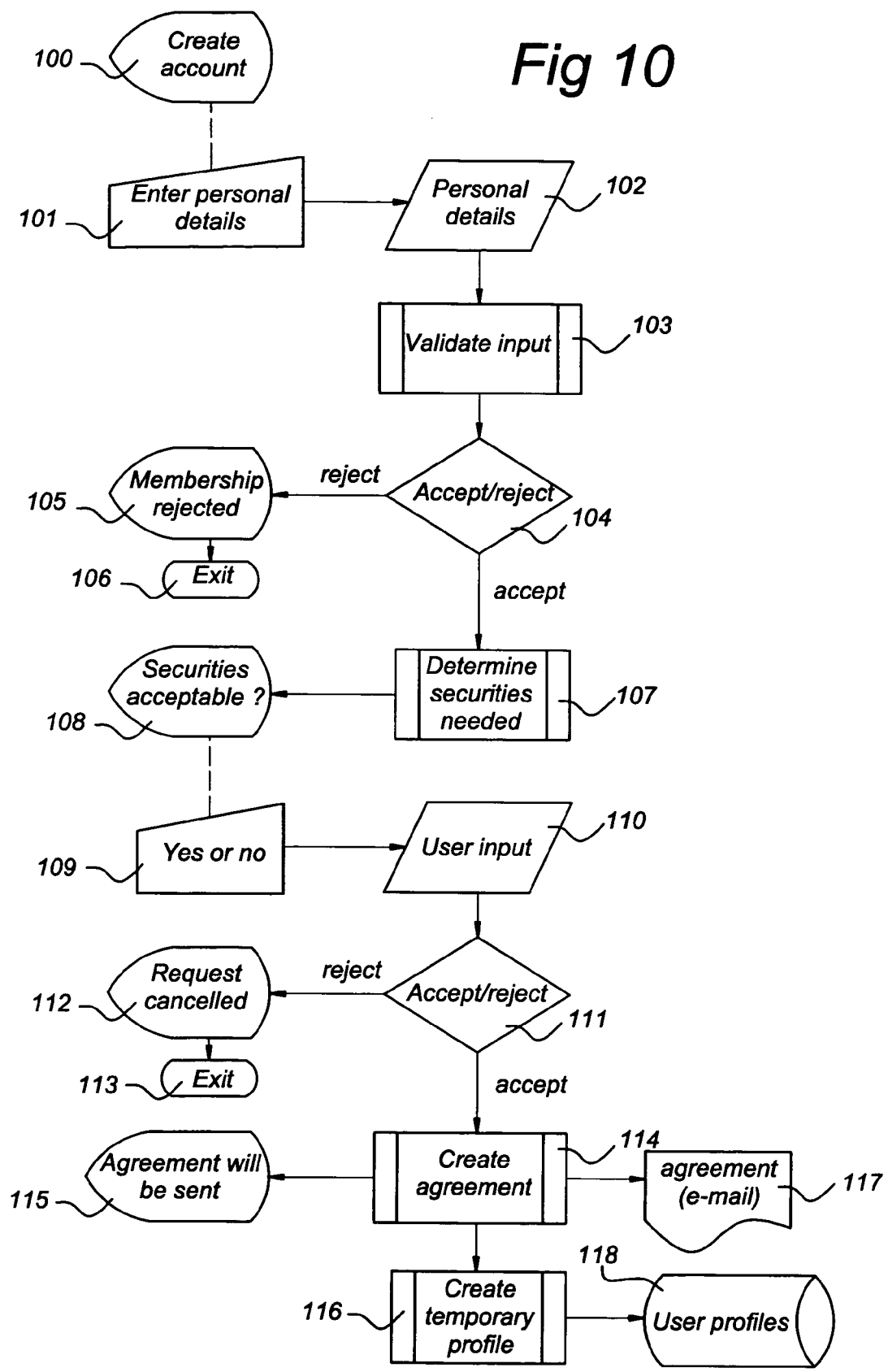

This is further illustrated in FIG. 10.

Enter Personal Details 100–102

A form is displayed in which the visitor can enter personal details [100]. Some of the validations take place within the form (pre-validation). The data entered [101] are transmitted to the application server [102].

Validation of Data Input 103–106

On the basis of the data entered it is determined whether the application can be accepted [103]. If this is not the case [104] a rejection screen is displayed [105] and the process is terminated [106].

Acceptance of Securities 107–113

The securities required are determined [107] and the visitor is informed of this requirement [108]. The visitor has the option of accepting or rejecting the securities [109] [110] [111]. If the visitor does not accept, a rejection screen is displayed [112] and the process is terminated [113].

Creation of Agreement and Storage of Temporary Profile 114–118

If the visitor does accept, an agreement is drawn up [114] and a message to this effect is displayed on the screen [115]. The agreement is sent to the new user by e-mail [117]. A temporary profile is then created [116] and this is stored in a 'User Profiles' table [118].

Access to the 'Restricted Area' 34

Figure 11:
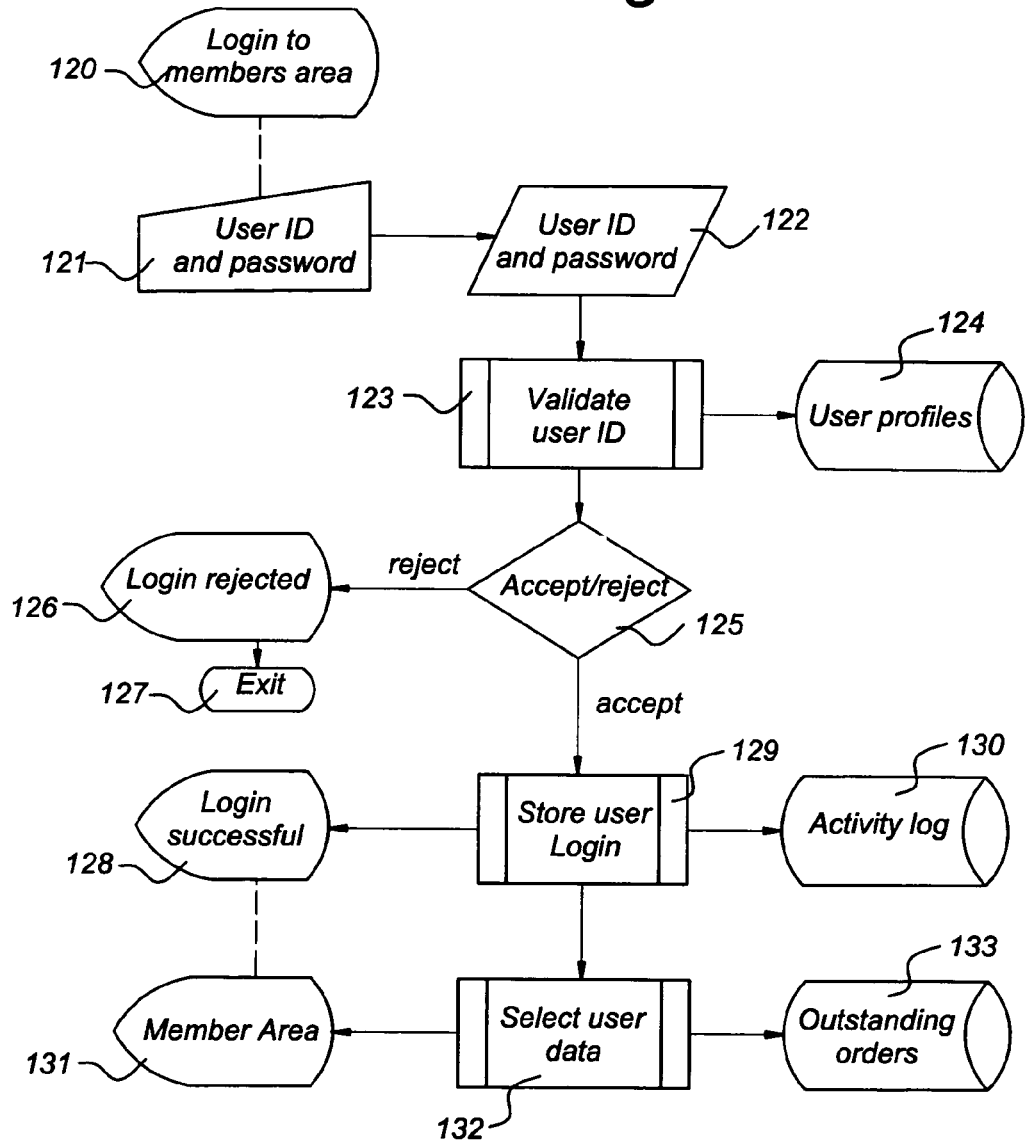

To gain access to the restricted area a visitor must log in using the user ID issued to him/her and the chosen password. After successful logging-in, the outstanding orders are displayed plus the transactions with associated results for the past 48 hours. See FIG. 11.

Entry of User ID and Password 120–122

A form is displayed [120] in which the visitor can enter his/her ID and password [121]. The data entered are transmitted to the application server [122].

Validation of User ID and Password 123–127

The user ID entered is looked up in a 'User Profiles' table 124. If the user ID is valid the associated password is compared with the password entered [123]. If the data are incorrect a rejection screen is displayed [126] and the process is terminated [127].

Recording a Valid Visitor 128–130

If the visitor is accepted, he/she receives a message that access to the protected area of the website has been granted [129]. The log-in is also recorded in an 'Activity Log' table 130.

Display 'Members Area' Main Menu 131–133

The outstanding orders and the transactions carried out in the past 48 hours which belong to the visitor are retrieved from an 'Outstanding Orders' table 133 and displayed in the main menu [131].

Viewing the User Profile 37

Figure 12:
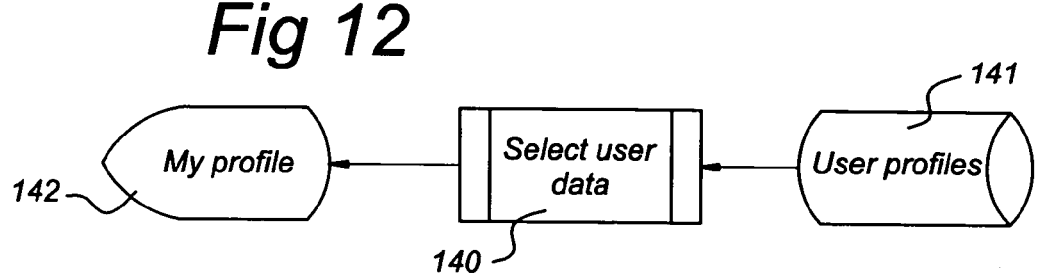

The user who has logged in can view the personal data which he/she has entered as well as the limit set. See FIG. 12.

Viewing the User Profile 140–142

The profile data are retrieved [140] from a 'User Profiles' table 141 on the basis of the user ID and displayed on the screen [142].

Viewing Own Portfolio 38

The visitor who has logged in can view his/her portfolio, broken down into coupons purchased and coupons sold. The following data are given per coupon:
the market;
the term;
the coupon value;
the currency;
the number of coupons;
the coupon rate;
the coupon price;
total price received/paid;
transaction date and time.

Figure 13:
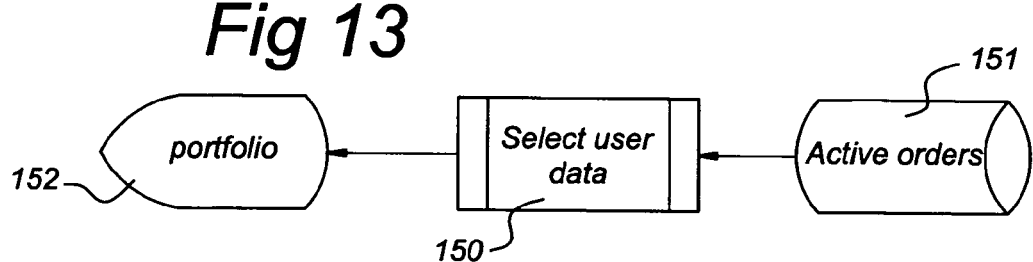

See also FIG. 13.

Viewing Own Portfolio 150–152

The active orders are retrieved [150] from an 'Active Orders' table 151 on the basis of the user ID and displayed on the screen [152].

Viewing the Transaction History 39

Figure 14:
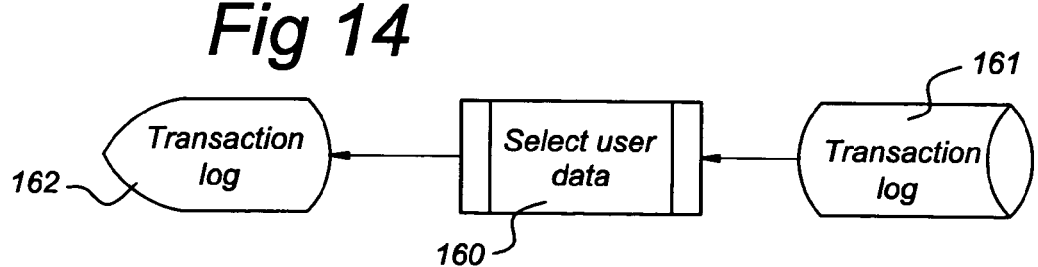

The visitor who has logged in can view all orders ever placed by him/her and the associated results. See also FIG. 14.

Viewing the Transaction History 160–162

The data are retrieved [160] from a 'Transaction Log' 161 on the basis of the user ID and displayed on the screen [162]. The 'Transaction Log' 161 is updated in the 'Time-out Orders Due' [191] and 'Matching Process' [197] processes (see FIG. 16). Purging of the 'Transaction Log' takes place in the 'Purge Transaction Log' process [199] (see FIG. 16).

Placing Purchase Orders and Orders for Sale 40–45

The visitor who has logged in can place purchase orders and orders for sale. For this operation the current Coupon Rates are displayed as an indication of the current coupon rates which apply for the market at that point in time. The visitor then enters the following data:
the market;
the term;
the coupon value;
the currency;
the number of coupons;
the coupon rate the visitor wishes to pay or receive.

After the visitor has entered these data a calculation is made to determine whether this order may be placed by this visitor on the basis of his/her set limit. If the order may be placed, a message to this effect is displayed on the screen, supplemented by the coupon price and the total sum that has to be paid or will be received if the order is accepted. The order is also added to the transaction log and added to the active orders.

Figure 15:
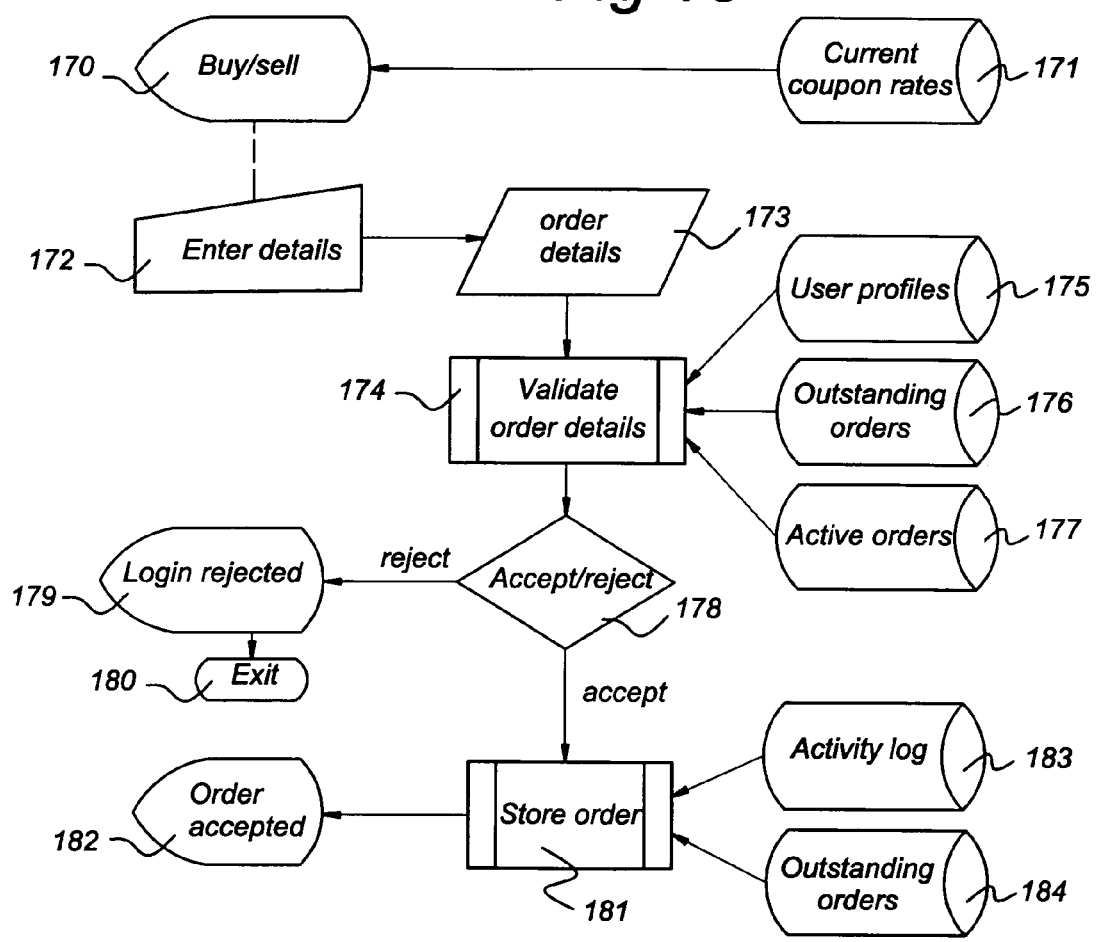

The various aspects are illustrated in more detail in FIG. 15.

Entering a Purchase Order or Order for Sale [170–171]

A form is displayed in which the visitor can enter his/her purchase orders or orders for sale. Different screens are used for purchase orders and orders for sale, but order processing is identical. The most recent prices are retrieved from a 'Current Coupon Rates' table 171 and are displayed on the screen. The user enters his/her data [172]. Some of the validation takes place within the form (pre-validation). The data entered are transmitted to the application server [173].

Validation of Purchase Order or Order for Sale [174–180]

On the basis of the user ID a check is made [174] to determine whether the purchase order or order for sale can be accepted. For this purpose the user profile is retrieved from a 'User Profiles' table 175. In addition, the active orders for the visitor concerned are queried from an 'Active Orders' table 177 and the outstanding orders for the visitor concerned are queried from the 'Outstanding Orders' table 176. A check is made [178] to determine that the visitor's limit will not be exceeded by the purchase order or order for sale that has been entered. If the order is not permitted, a rejection screen is displayed [179] and the process is terminated [180].

Registration of Valid Purchase Order or Order for Sale 181–184

If the order is accepted a message to this effect is displayed to the visitor [182] and the order is stored [181]. The order is added to an 'Outstanding Orders' table 184. The receipt of a new order is also recorded in an 'Activity Log' table 183.

Other Processes

In addition to the above processes, a number of 'domestic' processes also take place. These processes ensure that:
  outstanding orders which have not been accepted within 6 hours are tagged as 'timed out' and consequently are no longer for sale/purchase;
  if an order is placed and can be matched with an outstanding order, these orders are both tagged as 'accepted' and are carried out;
  a transaction log is compiled for each visitor logged in.

Figure 16:
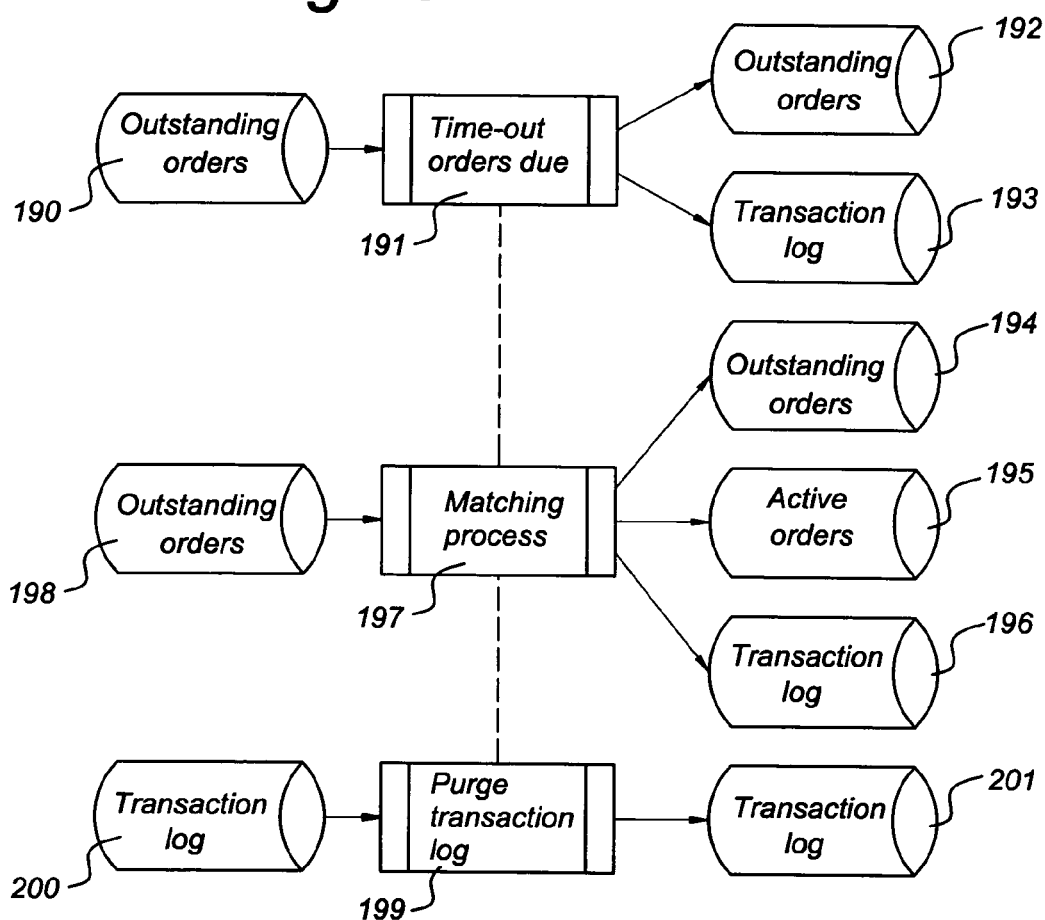

This is further illustrated in FIG. 16.

Order Expiry 190–193

The 'Time-out Orders Due' process [191] reads an 'Outstanding Orders' table 190 sequentially. If an order is outstanding for more than 6 hours it is tagged as 'Timed-out' in the 'Outstanding Orders' table [192]. If an order is more than 48 hours old it is removed from the second 'Outstanding Orders' table 192. Each action (time-out and removal) is recorded in a 'Transaction Log' 193.

Order Matching 194–198

A Matching Process' [197] reads the 'Outstanding Orders' table [198] and attempts to match purchase orders with orders for sale. All outstanding orders (not 'timed-out' or 'matched') are read. If a match can be made, both orders acquire the status 'Matched' in the 'Outstanding Orders' table [194]. Both orders are also written to an 'Active Orders' table [195] and the action taken is recorded in a 'Transaction Log' [196].

Purge Log Process 199–201

The 'Purge Transaction Log' process [199] reads the 'Transaction Log' [200] sequentially and deletes the transactions older than a predetermined term, so that an updated 'Transaction Log' is produced [201].

The invention claimed is:

1. Computer program product that can be loaded on a computer installation for supporting a financial transaction, which computer installation comprises at least one memory and a processor connected with the it least one memory and which processor can perform the following steps after the computer program product has been loaded on the computer installation:

a) storage of future index data $I_i$, where i=1, 2, ..., x, ..., in the at least one memory, each future index $I_i$ being defined as the anticipated factor by which, in a year i, goods will have become more expensive as a consequence of inflation, compared with a predetermined start year;

b) storage of future interest rates $int_i$, where i=1, 2, ..., x, ..., in the at least one memory, each interest rate $int_i$ being defined as the interest to be anticipated in year i;

c) receipt of a desired coupon value CV from a user, said coupon value being a value of money, for which a user wants to be covered against future inflation;

d) calculation of at least one future annual inflation value $inf_i$, where i=1, 2, ..., x, ..., for the coupon value CV in year i making use of the coupon value CV and of the future index data $I_i$;

e) calculation of a cash value of the at least one future annual inflation value $inf_i$ for the coupon value CV in year i making use of the coupon value CV, the future index data $I_i$ and the interest rates $int_i$;

f) presentation of a purchase price to the user at which the at least one future annual inflation value $inf_i$ for the coupon value CV, or a portion thereof, can be purchased; and g) the program enables the processor to track trading in the at least one future annual inflation value;

wherein the at least one future annual inflation value comprises an asset.

2. Data carrier provided with a computer program product according to claim 1.

3. A computerized installation for supporting a financial transaction, the installation comprising at least one memory, a program stored in the at least one memory and a processor connected to the at least one memory, the processor being capable of performing the following steps under the control of the program;

a) storage of estimated future inflation data, optionally future inflation index data, in the at least one memory;

b) storage of estimated future interest rate data;

c) receiving from a user a coupon value to be covered against future inflation;

d) employing the coupon value and the estimated future inflation data to calculate at least one fixture inflation-related adjustment of the coupon value for a future year, e) employing the coupon value, the future inflation data and the estimated future interest rate data to calculate a current cash value of the at least one future inflation-related adjustment of the coupon value; and f) presentation to the user of the computerized installation of a purchase price derived from the current cash value for purchasing the at least one future inflation-related adjustment of the coupon value or of a portion of the coupon value.

4. A computer installation according to claim 3 wherein the program enables the processor to track the sale to a purchaser of the inflation-related coupon value adjustment for the derived purchase price.

5. A computer installation according to claim 3 wherein the inflation-related coupon value adjustment comprises an asset, the inflation-related coupon value adjustment is tradable and the program enables the processor to track trading in the inflation-related coupon value adjustment.

6. A computer installation according to claim 3 wherein:

i) the estimated future inflation data are representable as future inflation index data $I_i$, where i=1, 2, ..., x, ..., each future index $I_i$ are defined as the anticipated factor by which, in a year i, products will have become more expensive as a consequence of inflation, compared with a predetermined start year;

ii) the future interest rate data are representable as $int_i$, where i=1, 2, ..., x, ..., in the at least one memory, each interest rate $int_i$ being defined as the interest to be anticipated in year i, iii) the coupon is representable as CV;

iv) the future annual inflation-related adjustment is representable as $inf_i$, where i=1, 2, ..., x, ..., and is calculated for the coupon value CV in year 1; and v) the calculated cash value of the future annual inflation-related adjustment $inf_i$ is calculated for the coupon value CV in year i employing the coupon value CV, the future index data $I_i$; and the interest rates $int_i$.

7. Installation according to claim 6, wherein the processor is equipped to:

calculate, in step (d), a cumulative inflation cover value $CAP_i$ for the coupon value CV from a start year to year i;

calculate, in step (e), a cumulative cash value $P_i$ of the cumulative inflation cover value $CAP_i$ for the coupon value CV from the start year to year i;

present to the user, in step (f), the purchase price at which the cumulative inflation cover value $CAP_i$ for the coupon value CV can be purchased.

8. Installation according to claim 7, wherein the processor is equipped to:

calculate a future index $I_x$ in a year x as follows:

$$I_x = \prod_{i=1}^{x} (1 + inf_i)$$

calculate the cumulative inflation cover value $CAP_x$ in year x as follows: and $$CAP_x = CV \cdot \sum_{i=1}^{x} (I_i - 1)$$

calculate the cumulative cash value $P_x$ in year x as follows:

$$P_x = CV \cdot \sum_{i=1}^{x} \frac{(I_i - 1)}{(1 + \text{int}_i)^i}$$

9. Installation according to claim 6, wherein the future index data are determined on the basis of at least one price index total from the following series:
   all households;
   all households derived;
   employees, low;
   employees, low derived;
   employees, high;
   employees, high derived.

10. Installation according to claim 3, wherein the coupon value relates to an income-producing real property and calculation of the purchase price also takes account of at least one of the following parameters: risk of property standing empty and expected inflation elsewhere.

11. Installation according to claim 3, wherein the purchase price is offered to the user in the form of an inflation coupon providing cover against inflation in at least one of the following regions: Europe, the UK, the USA and Japan.

12. Installation according to claim 3, wherein the currency of the coupon value for a territory provides cover against inflation in that territory.

13. Installation according to claim 3, wherein the currency of the coupon value for a territory provides cover against inflation in another territory.

14. Installation according to claim 3, wherein data relating to at least one of the following categories are stored in the at least one memory:
   user profiles;
   outstanding purchase orders and orders for sale;
   active orders;
   log of purchase orders, orders for sale and lapsed orders;
   log of user activities.

15. Installation according to claim 3, wherein the computer installation can communicate with other computer devices via a telecommunications system.

16. Installation according to claim 15, wherein the telecommunication system is the Internet.

17. A method for supporting a financial transaction employing a computerized installation comprising at least one memory, a program stored in the at least one memory and a processor connected to the at least one memory, the method comprising performing the following steps on the computerized installation:
   a) storage of estimated future inflation data, optionally future inflation index data, in the at least one memory;
   b) storage of estimated future interest rate data;
   c) receiving from a user a coupon value to be covered against future inflation;
   d) employing the coupon value and the estimated future inflation data to calculate at least one future inflation-related adjustment of the coupon value or a portion of the coupon value for a future year wherein said inflation-related adjustment provides inflation cover for the coupon value;
   e) employing the coupon value, the fixture inflation data and the estimated future interest rate data to calculate a current cash value of the inflation cover; and
   f) presentation to the user of a purchase price derived from the current cash value for purchasing the inflation cover or;
   wherein the inflation cover comprises an asset and the method further comprises trading in the inflation cover.

18. A method of conducting a financial transaction supported by a method according to claim 17 comprising selling the inflation-related adjustment to a purchaser at the derived purchase price.

19. A method according to claim 17 wherein:
   i) the estimated future inflation data are representable as future inflation index data $I_i$, where i=1, 2, ..., x, ..., each future index $I_i$ are defined as the anticipated factor by which, in a year i, products will have become more expensive as a consequence of inflation, compared with a predetermined start year;
   ii) the future interest rate data are representable as $\text{int}_i$, where i=1, 2, ..., x, ..., in the at least one memory, each interest rate $\text{int}_i$ being defined as the interest to be anticipated in year i;
   iii) the coupon is representable as CV;
   iv) the future annual inflation-related adjustment is representable as $\text{inf}_i$, where i=1, 2, ..., x, ..., and is calculated for the coupon value CV in year 1; and
   v) the calculated cash value of the future annual inflation-related adjustment $\text{inf}_i$ is calculated for the coupon value CV in year i employing the coupon value CV, the future index data $I_i$ and the interest rates $\text{int}_i$.

20. Method according to claim 19 comprising the following steps:
   calculation, in step (d), of a cumulative inflation cover value $CAP_i$ for the coupon value CV from the start year to year i;
   calculation, in step (e), of a cumulative cash value $P_i$ of the cumulative inflation cover value $CAP_i$ for the coupon value CV from the start year to year i;
   presentation to the user, in step (t), of the purchase price at which the cumulative inflation cover value $CAP_i$ for the coupon value CV can be purchased.

21. Method according to claim 19, comprising the following steps:
   calculation of a future index $I_x$ in a year x as follows:

$$I_x = \prod_{i=1}^{x} (1 + \text{inf}_i)$$

calculation of the cumulative inflation cover value $CAP_x$ in year x as follows:

$$CAP_x = CV \cdot \sum_{i=1}^{x} (I_i - 1)$$

calculation of the cumulative cash value $P_x$ in year x as follows:

$$P_x = CV \cdot \sum_{i=1}^{x} \frac{(I_i - 1)}{(1 + \text{int}_i)^i}$$

22. Method according to claim 17 wherein calculation of the purchase price also takes account of at least one of the following parameters: risk of property standing empty and expected inflation elsewhere.

23. Method according to claim 17 wherein the future index data are determined on the basis of at least one price index total selected from the following series:
   all households;
   all households derived;
   employees, low;
   employees, low derived;
   employees, high;
   employees, high derived.

24. Method according to claim 17 comprising offering the purchase price to the user in the form of an inflation coupon providing cover against inflation in at least one of the following regions: Europe, the UK, the USA and Japan.

25. Method according to claim 17 wherein the currency of the coupon value for a territory provides cover against inflation in that territory.

26. Method according to claim 17 wherein the currency of the coupon value for a territory provides cover against inflation in another territory.

27. Method according to claim 17 wherein data relating to at least one of the following categories are stored in the at least one memory:
   user profiles;
   outstanding purchase orders and orders for sale;
   active orders;
   log of purchase orders, orders for sale and lapsed orders;
   log of user activities.

28. Method according to claim 17 wherein the computer installation can communicate with other computer devices via a telecommunications system.

29. Method according to claim 17 wherein the telecommunications system is the Internet.

* * * * *